(12) United States Patent  
Shea et al.

(10) Patent No.: US 8,931,055 B2  
(45) Date of Patent: Jan. 6, 2015

(54) ENTERPRISE ENTITLEMENT FRAMEWORK

(75) Inventors: Michael R. Shea, Chicago, IL (US); Scott A. Alfieri, Califon, NJ (US); Angelo A. Motta, New York, NY (US)

(73) Assignee: Accenture Global Services GmbH, Dublin (IE)

(*) Notice: Subject to any disclaimer, the term of this patent is extended or adjusted under 35 U.S.C. 154(b) by 1786 days.

(21) Appl. No.: 11/469,414

(22) Filed: Aug. 31, 2006

(65) Prior Publication Data

US 2008/0060058 A1 Mar. 6, 2008

(51) Int. Cl.  
*H04L 29/06* (2006.01)  
*G06F 21/62* (2013.01)  
*G06F 21/60* (2013.01)

(52) U.S. Cl.  
CPC ............ *G06F 21/6218* (2013.01); *H04L 63/20* (2013.01); *G06F 21/604* (2013.01); *G06F 2221/2101* (2013.01); *G06F 2221/2145* (2013.01); *Y10S 707/9994* (2013.01); *Y10S 707/99932* (2013.01); *Y10S 707/99944* (2013.01); *Y10S 707/99945* (2013.01); *Y10S 707/99946* (2013.01); *Y10S 707/99947* (2013.01); *Y10S 707/99939* (2013.01)  
USPC .......... 726/4; 726/5; 726/7; 726/28; 709/201; 709/202; 709/203; 709/225; 707/999.01; 707/999.002; 707/999.103; 707/999.104; 707/999.105; 707/999.106; 707/999.009; 707/802; 707/803; 707/810

(58) Field of Classification Search  
USPC ............................................................ 726/4  
See application file for complete search history.

(56) References Cited

U.S. PATENT DOCUMENTS

| | | | | |
|---|---|---|---|---|
| 5,261,102 A | * | 11/1993 | Hoffman .......................... | 726/19 |
| 5,568,639 A | * | 10/1996 | Wilcox et al. ...................... | 1/1 |
| 5,903,720 A | * | 5/1999 | Stokes ............................. | 726/4 |
| 5,930,801 A | * | 7/1999 | Falkenhainer et al. ............... | 1/1 |
| 6,418,447 B1 | * | 7/2002 | Frey et al. ......................... | 1/1 |
| 6,449,627 B1 | * | 9/2002 | Baer et al. ....................... | 715/206 |
| 6,601,233 B1 | * | 7/2003 | Underwood .................. | 717/102 |
| 6,983,321 B2 | * | 1/2006 | Trinon et al. ................. | 709/224 |
| 7,130,885 B2 | * | 10/2006 | Chandra et al. .............. | 709/206 |
| 7,203,945 B2 | * | 4/2007 | Kravtchenko et al. ........ | 719/313 |
| 7,467,373 B2 | * | 12/2008 | Pepin et al. ................... | 717/108 |
| 7,529,680 B2 | * | 5/2009 | Sunday et al. ................ | 705/309 |
| 8,443,036 B2 | * | 5/2013 | Li et al. ........................ | 709/203 |

(Continued)

OTHER PUBLICATIONS

Prakash, A., et al (Oracle), 'Oracle Role Manager Users Guide', Release 10g (10.1.4), Oracle, 2007,2008, entire document, http://docs.oracle.com/cd/E12058_01/doc/doc.1014/e12027.pdf.*

(Continued)

*Primary Examiner* — Bradley Holder  
*Assistant Examiner* — Ronald Baum  
(74) *Attorney, Agent, or Firm* — Brinks Gilson & Lione

(57) ABSTRACT

A method and system for managing privilege information across multiple applications and/or databases is provided. A flexible and extensible enterprise entitlement framework may be implemented to store and manage various types of privileges, access rights and resources. The enterprise entitlement framework may include a variety of data objects and structures configured to store various components and/or aspects of a privilege. The data objects may include resource type objects, user objects, role objects, action objects, resource attribute objects, list item object and/or hierarchy objects. The data objects defined for a particular privilege may further be linked according to relationships between one or more objects. The enterprise entitlement framework is extensible for use with new applications by defining new objects compatible with the privilege structures of the new applications.

21 Claims, 23 Drawing Sheets

(56) References Cited

U.S. PATENT DOCUMENTS

| | | | |
|---|---|---|---|
| 8,478,616 B2* | 7/2013 | De Klerk et al. | 705/7.11 |
| 2002/0091702 A1* | 7/2002 | Mullins | 707/100 |
| 2003/0115322 A1 | 6/2003 | Moriconi et al. | |
| 2005/0028006 A1* | 2/2005 | Leser et al. | 713/200 |
| 2006/0036891 A1* | 2/2006 | Halevy | 714/2 |
| 2006/0206507 A1* | 9/2006 | Dahbour | 707/100 |
| 2006/0225032 A1* | 10/2006 | Klerk et al. | 717/105 |
| 2006/0259954 A1* | 11/2006 | Patrick | 726/2 |
| 2006/0277595 A1* | 12/2006 | Kinser et al. | 726/3 |
| 2007/0136364 A1* | 6/2007 | Mejia et al. | 707/103 R |
| 2007/0162494 A1* | 7/2007 | Schneider | 707/103 R |
| 2007/0203771 A1* | 8/2007 | Caballero et al. | 705/8 |
| 2007/0222589 A1* | 9/2007 | Gorman et al. | 340/539.26 |
| 2008/0104032 A1* | 5/2008 | Sarkar | 707/3 |

OTHER PUBLICATIONS

NetIQ, 'Identity Manager Roles Based Provisioning Module 3.7.0 User Application: User Guide', NetIQ Corp., 2014, entire document, https://www.netiq.com/documentation/idmrbpm37/ugpro/data/bjygxzg.html.*

Vventuri, "View of /org.glite.security.voms-oracle/config/voms-oracle.data", Jun. 16, 2006, retrieved from the internet on Oct. 21, 2009 from <http://jralmw.cvs.cern.ch:8180/cgi-bin/jralmw.cgi/org.glite.security.voms-oracle/config/voms-oracle.data?revision=1.2.2.1&view=markup>, 8 pages.

"ITU-T Recommendation X.741 Corrigendum 1", ITU-T Telecommunication Standarization Sector of ITU, Geneva, CH, Oct. 1, 1996, 250 pages.

European Search Report for Application No. 07253440.7—2212, dated Nov. 18, 2009, 8 pages.

* cited by examiner

Resource_Attribute_Template

| | |
|---|---|
| Resource_Attribute_Template_ID | 1000 |
| Resource_Type_ID | 1000 |
| Node_Type_ID | 2000 |
| Nullability | 0 |
| Grantable | 1 |
| List_ID | 0 |
| Parent_Resource_Attribute_Template_ID | 0 |
| | |
| Resource_Attribute_Template_ID | 1001 |
| Resource_Type_ID | 1000 |
| Node_Type_ID | 2001 |
| Nullability | 0 |
| Grantable | 1 |
| List_ID | 0 |
| Parent_Resource_Attribute_Template_ID | 1000 |
| | |
| Resource_Attribute_Template_ID | 1002 |
| Resource_Type_ID | 1000 |
| Node_Type_ID | 2002 |
| Nullability | 0 |
| Grantable | 1 |
| List_ID | 0 |
| Parent_Resource_Attribute_Template_ID | 1001 |
| | |
| Resource_Attribute_Template_ID | 1003 |
| Resource_Type_ID | 1000 |
| Node_Type_ID | 2003 |
| Nullability | 0 |
| Grantable | 1 |
| List_ID | 0 |
| Parent_Resource_Attribute_Template_ID | 1002 |
| | |
| Resource_Attribute_Template_ID | 1004 |
| Resource_Type_ID | 1000 |
| Node_Type_ID | 2004 |
| Nullability | 0 |
| Grantable | 1 |
| List_ID | 1000 |
| Parent_Resource_Attribute_Template_ID | 1003 |

519 —

Resource_Type

| | |
|---|---|
| Resource_Type_ID | 1000 |
| Resource_Type_Name | Public Works System |
| Hierarchy_ID | 1000 |
| Description | Public Works System |

ENTERPRISE ENTITLEMENT FRAMEWORK

FIELD OF ART

The invention relates generally to computer security. Specifically, the invention relates to a flexible framework for managing user privileges across multiple applications on a computer system or network.

BACKGROUND

Access to information, applications and other types of resources is commonly regulated based on privileges assigned to users and/or devices. For example, privileges may define a level of security clearance that a user and/or device must have or meet to access a particular resource. Thus, if an application requires top secret clearance, a user may be required to have top secret privileges in order to access and/or use the application or functions thereof. Similarly, access to one or more portions of a company's financial data may be regulated by a user's title and/or rank as defined within the company or by the company's organization chart. For example, access to earnings projections for the current quarter might be restricted to those employees or users having a title or position of Manager or higher. Accordingly, those that have not attained a position of Manager might be denied access to the earnings projections.

Oftentimes, multiple applications and/or databases within a company or organization may use the same or similar privilege structures to manage access. To streamline the use and management of privilege information in such instances, companies and organizations have implemented management applications to centrally control privilege data common to the various databases and/or applications. For example, many current methods of managing privilege information across multiple applications use various Lightweight Directory Access Protocol (LDAP) solutions. When new applications and/or databases are added to the privilege management system, however, LDAP solutions generally require additional programming and/or development to accommodate the new applications and/or databases. In addition, LDAP solutions may also require further modification and/or reconfiguration in response to an application currently managed by the LDAP solution being updated and/or reconfigured.

For the foregoing reasons, a flexible and extensible system and method for managing privilege information across multiple applications and/or databases is needed.

SUMMARY

Many of the aforementioned problems are solved by providing a flexible and extensible enterprise entitlement framework a foundation for privilege management systems. The enterprise entitlement framework may include a variety of data structures and objects that may be used to represent and/or store one or more components of a privilege. For example, a resource type object may identify an application or type of application to which a privilege controls access. Similarly, an action object may store one or more actions authorized by a certain privilege. Other data objects may include role objects, user objects, hierarchy objects and rules objects. These other data objects may represent additional or alternative components of a privilege. Accordingly privileges may be user-based or role-based depending on management preferences and other factors. In other words, a privilege may be defined for one or more specified users or, alternatively or additionally, may be defined for specified roles.

The data objects in the infrastructure may further include relationships and references to one another. In one example, a privilege object may include a reference to a resource type object corresponding to the resource type to which the privilege applies. Privileges may further be associated with one or more rule objects that specify conditions under which the privileges may be granted. For example, a rule object may store a time of day condition that may control when an associated privilege may be exercised. Parsing and storing the aspects of a privilege into various component objects and structures allows a privilege management system the flexibility to provide and adapt privilege management capabilities to new resource and privilege types.

In another aspect, maintenance objects may further be defined to support functions such as auditing and reporting. Maintenance objects may be categorized into three general groups: History Tracking, Error Logging and Activity Tracking, and Resource Import. An Action history tracking object, for example, may be used to track a history of modifications made to a particular action object. Error Logging and Activity Tracking objects, on the other hand, may be used to log all actions and/or resulting errors corresponding to an associated object. For example, if a user performed an action on a particular resource type resulting in an error, an error logging object associated with the particular resource type may generate an entry in a log recording the error as well as the action that produced the error. One or more triggers may be used to define when data is logged or tracked. Resource import objects may further store tables of information relating to hierarchies, products and actions managed by the infrastructure and management system to be included in a privilege. The data saved in each of the maintenance objects may be retrieved by a user to determine a variety of information including the cause of a malfunction and/or privilege changes made since a specified time.

In yet another aspect, privilege rules and privilege cascades may be used to automatically redefine a privilege scope. Privilege rules, for example, may be used to qualify a privilege. For example, a privilege such as "ordering business cards" may be qualified by the rule "if the ordering party is in the procurement department." As such, even if the privilege is assigned to a particular role, a party associated with that particular might not be authorized to order business cards if the party is not in the procurement department. If the user changes departments to the procurement department, the validity of the privilege for the user may automatically change based on an evaluation of the privilege rule. Privilege cascades, on the other hand, allow a user to add a privilege and apply it to a set of nodes or items based on a specified relationship to a selected node or item. For example, a privilege cascade option called "All Children" may assign a privilege to all children nodes of a selected hierarchy node. In one or more embodiments, if a new hierarchy node is added as a child of the selected hierarchy node, the privilege scope may be redefined to include the new child.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which:

FIGS. 5A-5E are diagrams illustrating the creation and definition of role-based privileges and associated objects according to one or more aspects described herein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
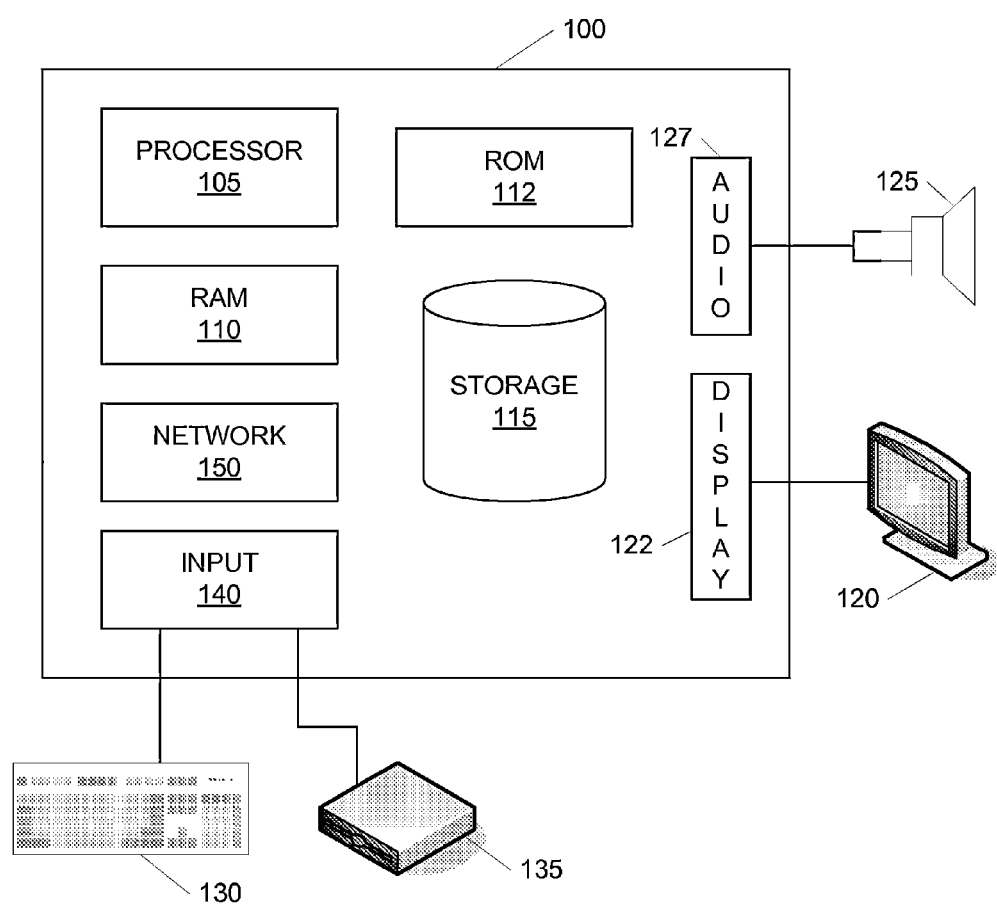
FIG. 1 illustrates a block diagram of a computing environment in which one or more aspects described herein may be implemented.

FIG. 1 illustrates a computing environment in which one or more aspects described herein may be implemented. A computing device such as computer 100 may house a variety of components for inputting, outputting, storing and processing data. For example, processor 105 may perform a variety of tasks including executing one or more applications, retrieving data from a storage device such as storage 115 and/or outputting data to a device such as display 120. Processor 105 may be connected to Random Access Memory (RAM) module 110 in which application data and/or instructions may be temporarily stored. RAM module 110 may be stored and accessed in any order, providing equal accessibility to the storage locations in RAM module 110. Computer 100 may further include Read Only Memory (ROM) 112 which allows data stored thereon to persist or survive after computer 100 has been turned off. ROM 112 may be used for a variety of purposes including for storage of computer 100's Basic Input/Output System (BIOS). ROM 112 may further store date and time information so that the information persists even through shut downs and reboots. In addition, storage 115 may provide long term storage for a variety of data including applications and data files. Storage 115 may include any of a variety of computer readable mediums such as disc drives, optical storage mediums, magnetic tape storage systems, flash memory and the like. In one example, processor 105 may retrieve an application from storage 115 and temporarily store the instructions associated with the application RAM module 110 while the application is executing.

Computer 100 may output data through a variety of components and devices. As mentioned above, one such output device may be display 120. Another output device may include an audio output device such as speaker 125. Each output device 120 and 125 may be associated with an output adapter such as display adapter 122 and audio adapter 127, which translates processor instructions into corresponding audio and video signals. In addition to output systems, computer 100 may receive and/or accept input from a variety of input devices such as keyboard 130, storage media drive 135 and/or microphone (not shown). As with output devices 120 and 125, each of the input devices 130 and 135 may be associated with an adapter 140 for converting the input into computer readable/recognizable data. In one example, voice input received through microphone (not shown) may be converted into a digital format and stored in a data file. In one or more instances, a device such as media drive 135 may act as both an input and output device allowing users to both write and read data to and from the storage media (e.g., DVD-R, CD-RW, etc.).

Computer 100 may further include one or more communication components for receiving and transmitting data over a network. Various types of networks include cellular networks, digital broadcast networks, Internet Protocol (IP) networks and the like. Computer 100 may include adapters suited to communicate through one or more of these networks. In particular, computer 100 may include network adapter 150 for communication with one or more other computer or computing devices over an IP network. In one example, adapter 150 may facilitate transmission of data such as electronic mail messages and/or financial data over a company or organization's network. In another example, adapter 150 may facilitate transmission or receipt of information from a world wide network such as the Internet. Adapter 150 may include one or more sets of instructions relating to one or more networking protocols. For example adapter 150 may include a first set of instructions for processing IP network packets as well as a second set of instruction associated with processing cellular network packets. In one or more arrangements, network adapter 150 may provide wireless network access for computer 100.

One of skill in the art will appreciate that computing devices such as computer 100 may include a variety of other components and is not limited to the devices and systems described in FIG. 1.

Figure 2:
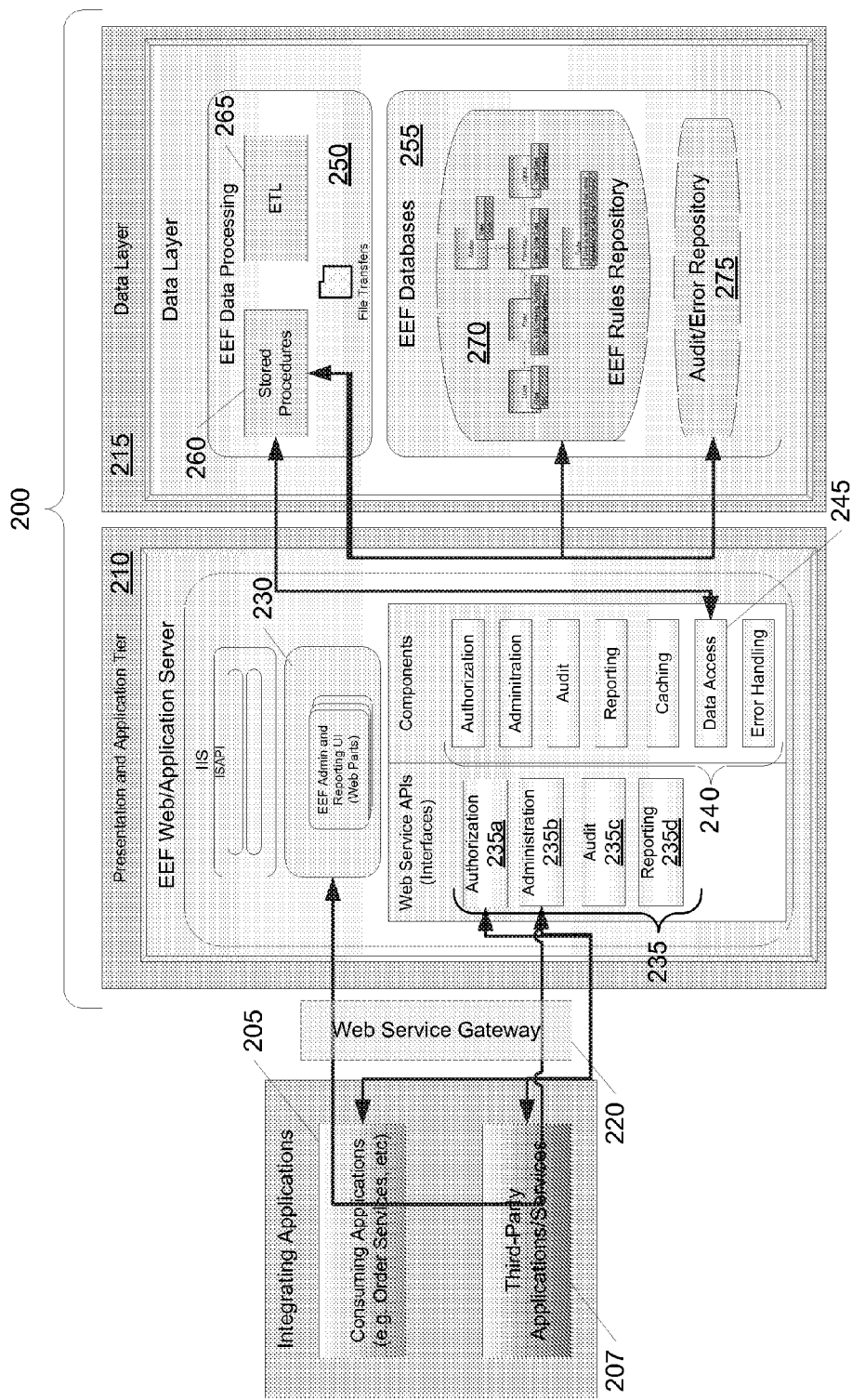
FIG. 2 is a diagram of a web system for managing privilege information across multiple applications according to one or more aspects described herein.

FIG. 2 is a diagram illustrating a central system 200 for storing and managing privilege information for one or more applications running across one or more computing system such as computer 100 (FIG. 1). System 200 may serve multiple applications 205, devices (not shown) and/or databases (not shown) to centrally coordinate and manage privilege information shared by the multiple applications 205, devices and/or databases. Central system 200 may include various components and layers including presentation/application tier 210 and data layer 215. Web services gateway 220 may also be implemented in system 200 to facilitate communication and other interaction between system 200 and applications 205, related devices and/or databases. For example, web services gateway 220 may include multiple communication protocols to allow applications using a variety of communication protocols to interface with system 200. Gateway 220 may further provide a layer of security such as data encryption for communications between system 200 and interfacing devices and/or applications.

In one or more arrangements, gateway 220 may further facilitate communication between system 200 and other security and identity management applications such as applications/services 207 to allow the other applications to integrate the features and functionalities of system 200. In one example, a service like SUN IDENTITY MANAGER may integrate the services and features of system 200 through web service gateway 220. Gateway 220 may be implemented as part of system 200 or alternatively, may be an independent process, application and/or device separate from system 200. Alternatively, according to one or more aspects, communication between applications 205 or a user and system 200 may be established directly. In other words, gateway 220 might not be used to facilitate communications. For example, batch exports prepared by system 200 may be directly transmitted to applications 205 without the help or use of web services gateway 220.

Presentation and application tier 210 may implement one or more web and application interfaces that may include web menus and control panels such as management console 230. Management console 230 may be implemented as an applet or program allowing a managing user to access and modify various privilege information stored in data layer 215. In particular, management console 230 may provide a graphical or non-graphical user interface through which a user may add/remove/manage privileges. Thus, when a user logs in to or otherwise accesses system 200, the user may be presented with various options and controls through management console 230. For example, a user may be provided options to assign a privilege to one or more users, roles, hierarchy nodes or list items. A user may further be given options for adding and deleting objects such as users, roles, actions, resource attributes and the like. Management console 230 may display additional information related to privilege status, number of privileges defined, privileges associated with a user, history of changes to privileges for a user, applications managed and the like.

In addition to management console 230, presentation/application tier 210 may further provide additional application programming interfaces (APIs) 235*a*, 235*b*, 235*c* and 235*d*. In one or more embodiments, APIs 235 may be implemented using an ASP.NET framework. Each API 235 may be dedicated to different processes in system 200 including authorization API 235*a*, administration API 235*b*, audit API 235*c* and reporting API 235*d*. For example, Authorization API 235*a* may facilitate tasks ranging from determining whether a user is authorized to perform one or more actions against a particular resource. Administration processes, on the other hand, may provide applications with functions calls for adding and removing privileges from system 200. Further, the Administration, Audit and Reporting APIs may provide information and one or more abilities that are provided by management console 230. Thus, rather than requiring a user to manually modify/retrieve privilege information from system 200 via management console 230, an application may automatically do so using administration API 235*b*. One of skill in the art will appreciate that various other APIs may be similarly included in system 200 depending on the functional needs of a user or organization.

Additionally, presentation and application tier 210 may include one or more service components 240 for executing and/or performing the services published through APIs 235*a*, 235*b*, 235*c* and 235*d*. Service components 240 may relate to various categories of procedures or tasks including authorization, administration, audit, reporting, caching, data access and/or error handling. Data access component 245, for example, may be dedicated to interfacing with data layer 215 and retrieving information from or saving information to data layer 215. Thus, to determine whether a user is authorized to perform a particular action in association with a specific item, data access component 245 may be called upon to provide access to data layer 215 and to retrieve privilege information related to the specified user, the action and/or the resource. Components 240 may also be interlinked, allowing one component to invoke the methods and services of another service component. In one example, reporting component may request data from data access component 245 to formulate a requested report.

Data layer 215 may further include data processing portion 250. Data processing potion 250 may define one or more procedures for storing, processing and/or retrieving data from data layer 215 and in particular, privilege information database 255. For example, stored procedures 260 may define how a resource type, user, role and/or privilege are to be stored in database 255. For example, procedures may be defined to allow a user to retrieve certain types of data from the system (e.g., GetListUserRoleMap). In another example, a procedure may be defined to insert a privilege (e.g., InsertPrivilege). Data processing portion 250 may further include an Extract-Transform-Load (ETL) system 265 that may perform extraction, transformation and loading operations in accordance with various procedures including those stored in procedures component 260. In one or more instances, ETL system 265 may be used to convert information received in a first format into a second format compatible with database 255. In one particular example, ETL system 265 may be used to load hierarchy information. Alternatively or additionally, ETL system 265 may load data into database 255 based on the rules and procedures of component 260.

Privilege information database 255 may store two types of repositories 270 and 275, that each has an independent function. For example, repository 270 may be responsible for storing privilege rules and information while repository 275 may be dedicated to audit and/or error storage. Each repository 270 and 275 may have specific storage procedures that are stored in and enforced by component 260. Rules repository 270 provides central storage of privilege and permission data relating to different users, roles, resource types, actions and privileges. Data may be extracted from repository 270 to check whether a user is authorized to perform one or more actions. The storage and enforcement of privileges and rules in the management infrastructure are discussed in further detail below. Audit/error repository 275, on the other hand, may store data relating to audits and/or diagnostics performed on repository 270 or another database. The stored audits and/or errors may be used to debug or verify the integrity of system 200 and/or databases used therein. The various elements described with respect to FIG. 2 may be combined and/or otherwise modified in numerous of ways. For example, in one alternate embodiment, repositories 270 and 275 may be combined into a single repository.

Figure 3A:
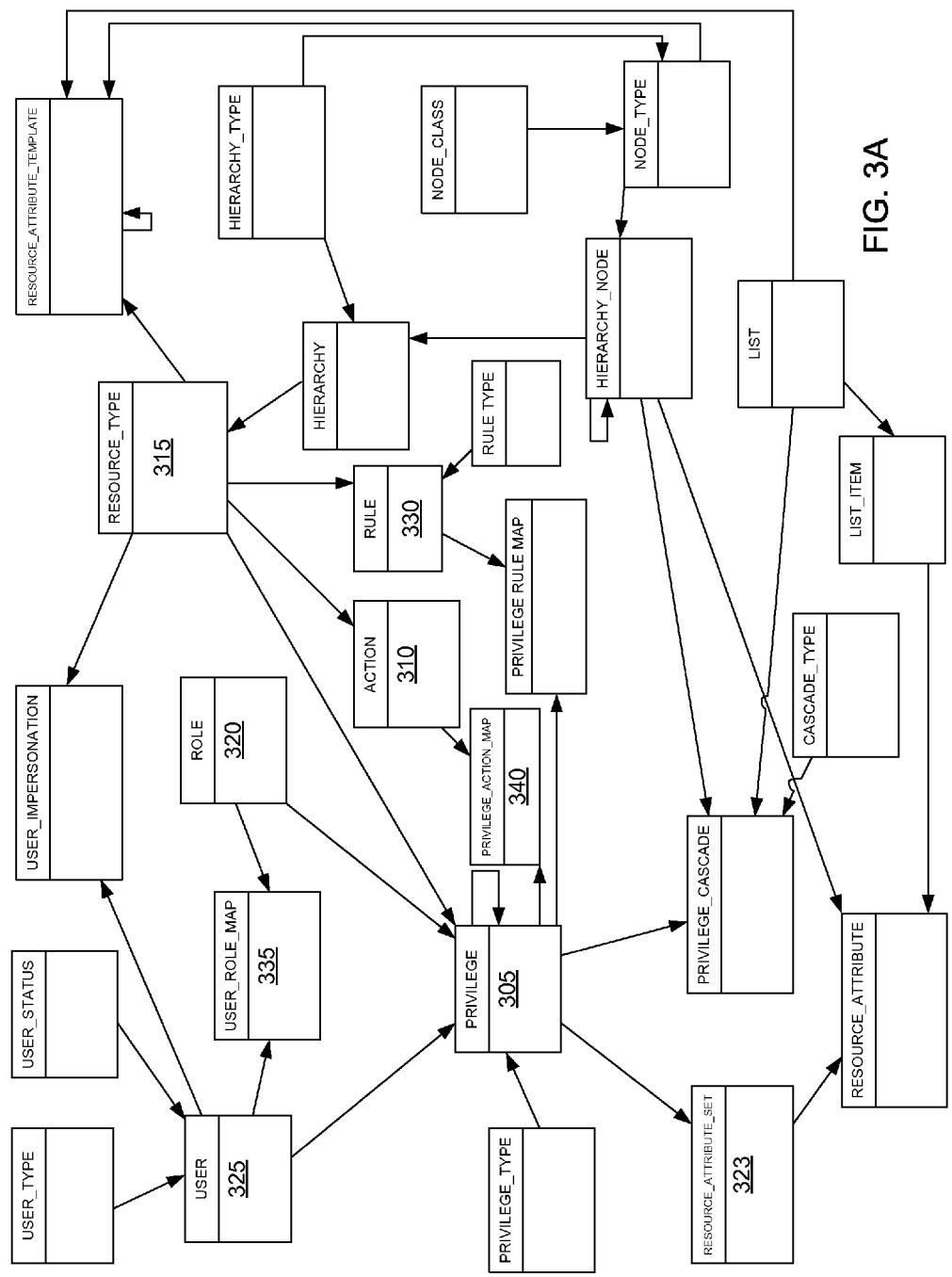
FIG. 3A illustrates a diagram of an enterprise entitlement framework for storing and implementing privileges according to one or more aspects described herein.

FIG. 3A is illustrates a data model for storing and representing privilege information. Among other objects and tables, model 300 may include objects relating to privileges 305, actions 310, resource types 315, roles 320, resource attribute set object 323, users 325, resource attribute object 326, hierarchy object 327, list object 328 and list item object 329. In one or more configurations, data model 300 may center on resource type object 315, which may be used to identify and represent a type of application for which one or more privileges may be defined. For example, resource type object 315 may represent financial applications, waterworks security system applications or subway management applications. Additionally, resource type may generally define the scope within which a privilege can be applied. Resource types may be defined broadly or narrowly depending on user preferences. For example, a resource type may be defined for transportation applications in general or, alternatively, a resource type may be defined for air transportation, ground transportation and water transportation applications, individually.

Additionally or alternatively, for each resource type, privileges or privilege objects 305 may be defined according to an associated hierarchy corresponding to, e.g., hierarchy object 327. Hierarchy object 327 may be generally used as a basis for defining the structure of a resource type for which privileges can be granted. That is, hierarchy object 327 may define a hierarchy based on a structure associated with application data that is used to define a privilege for the resource type. For example, telephone information and data associated with a telephone service management application may be organized and/or structured according to location and region. Thus, a hierarchy may be defined according to the location and region definitions and classifications specified by the telephone service management application. Alternatively or additionally, the hierarchy may represent an organizational structure that is used to define a privilege for the resource type. For example, hierarchy object 327 may define security levels or positions within an organization or company as well as the relationships between each level or position. In another example, hierarchy object 327 may define a geographic hierarchy including city, state, region and country levels or nodes for a transportation application resource type. The country node may represent the broadest level of the hierarchy, followed by region, state and city. Privileges defined by privilege object 305 may then be applied and/or associated to various levels of a hierarchy. Thus, transportation privileges that relate to activities on a national level may be associated with a country level or node in the hierarchy while one or more privileges relating to transportation intrastate highways may be associated with a state level in the hierarchy.

According to one or more aspects, a list of target items to which a privilege may be applied may be represented by list object 328. For example, a privilege stating that "James, as a supervisor, is allowed to modify time entries," may be decomposed to an action, "modify," on a target item, "time entries." In another example, a privilege may be created specifying that "James, as a supervisor, is allowed to modify expense entries." This privilege may be decomposed into an action, "modify," on a target item, "expense entries." According to one or more embodiments, a resource type may be associated with a predefined set of target items for which privileges may be defined. The set of target items may be represented by list object 328 while each target item in the set may be stored as an item object such as list item object 329. In one example, a financial application may include multiple target items such as quarterly earnings data, financial forecast information, expenditures data and/or investment records for which one or more privileges may be defined. As such, a user, in adding a privilege to the financial application, may select one or more items from the set of target items associated with the application or application type (i.e., resource type). Target/list items and lists as a whole may be added, deleted and/or otherwise modified. Alternatively or additionally, list/target items may further be associated with one or more specific levels in a hierarchy. That is, privileges for certain list/target items may be restricted to one or more specified hierarchy levels.

Associations and relationships between a privilege and one or more other objects may be defined using resource attributes represented by resource attribute object 326. For example, a hierarchy resource attribute may be defined such that it identifies a particular node or level in a hierarchy to which a privilege applies. Similarly, a list resource attribute may specify a particular list item to which a privilege corresponds. In other words, a resource attribute may define the scope of a privilege (i.e., the hierarchy nodes and/or list items to which the privilege applies). A privilege may be associated with multiple resource attributes including hierarchy and list resource attributes, the multiple attributes may be stored or defined as a resource attribute set. A resource attribute set may be defined and/or created based on resource attribute set object 323. Resource attribute sets generally refer to a group of resource attributes that may be associated with a single privilege or resource type. As such, a privilege may be associated with multiple list items or hierarchy nodes using multiple list resource attributes or a resource attribute set. In one or more configurations, a resource attribute set may enhance the data retrieval of resource attributes.

A privilege may include components such as users, user roles and actions to which the privilege relates. As such, actions may be stored and/or represented by an action object 310. Role objects 320, on the other hand, may be used to define user roles in an organizational structure while user objects 325 may be used to represent particular users or employees in the corresponding organization. In one or more instances, each user represented by a user object 325 may be associated with a role represented by role object 320. Each object in model 300, e.g., objects 305, 310, 315, 320, 323, 325, 326, 327, 328, 329 and 330 may further include one or more data fields and/or links that refer to other objects. For example, privilege object 305 may include fields that reference information associated with or stored in user object 325, resource type object 315, role object 320 and rules object 330. Data fields may be used to specify a variety of characteristics including identification information for each object.

The arrows illustrated in FIG. 3A and in various figures that follow represent links from one data object to another data object. Links may represent and store relationship information between data objects that may share and/or reference similar privilege information. The direction of the arrow may define which object is the reference object and which is the referencing object. For example, a link is shown linking resource type object 315 to privilege object 305. The link is directed towards privilege object 305. As such, the link may indicate that privilege object 305 includes one or more references to data stored and/or maintained by resource type object 305. Similarly, user-role map object 335 may reference and/or include data stored by both user object 325 and role object 320. Such links allow the enterprise entitlement framework (i.e., privilege management system) to define the associations between a variety of data and/or components corresponding to a particular privilege. More generally, the links between data objects provide meaning to individual objects associated with a privilege.

Figure 3B:
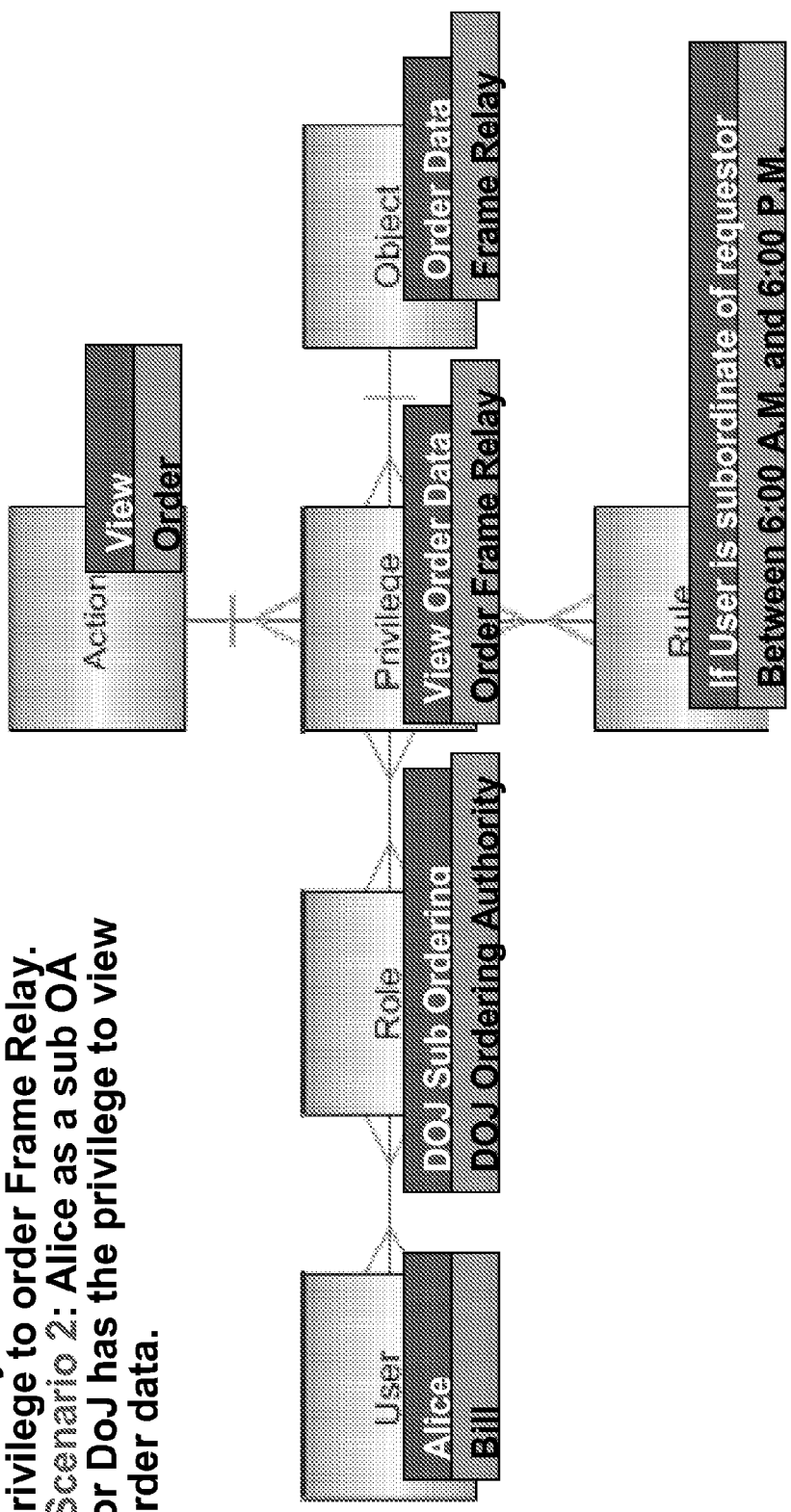
FIG. 3B is a diagram of two privilege scenarios and corresponding privilege mappings according to one or more aspects described herein.

FIG. 3B illustrates a diagram that conceptually maps two privilege scenarios to the various aspects and features of the data model described herein. The two privilege scenarios may be associated with the same resource type (e.g., a government procurement application type) or different resource types. The data model illustrated in FIG. 3B deconstructs the privileges into six components. In scenario 1, the privilege permits Bill, as an Ordering Authority for the Department of Justice (DoJ), to order Frame Relays. Decomposing the privilege of scenario 1 to the structures of the logical data model, "Bill" may be identified and stored as the user and "Ordering Authority for the DoJ" may be identified as the role in which the user, Bill, acts. The remaining components of the privilege (i.e., "ordering Frame Relay") may subsequently be parsed into a variety of additional objects including an action object and/or a list item object. For example, "order" may be interpreted as the action in the privilege and "Frame Relay" may be identified as the target item of the privilege. In one or more configurations, a privilege may further include a rule. A rule may represent a condition under which the user and/or role may perform the action on or with the resource. In one example, the condition may restrict the user, Bill, to exercising his privilege between the hours of 6:00 AM and 6:00 PM.

By parsing and storing privileges as individual components and characteristics, the logical data model/infrastructure may provide a management system with the flexibility and extensibility to implement new and/or modified privileges, resource types and roles as new applications are added and/or as old applications are modified. Further, the use of resource attributes to define relationships between various components of a privilege automatic evolution and self-adjustment/redefinition of privileges. For example, a privilege defined by a privilege object may be applied to additional target items by adding the new target items to a list identified in a resource attribute associated with the privilege. Thus, manual redefinition or reprogramming of the privilege or privilege object may be rendered unnecessary.

Scenario 2 of FIG. 3B describes Alice as a sub Ordering Authority (OA) for the DoJ having the privilege to view order data. Parsing the privilege in accordance with one or more arrangements of the entitlement framework and model, the user may be defined as "Alice," "sub Ordering Authority for the DoJ" as the role, "viewing" as the action and "order data" as the list item. A rule such as "if the user is a subordinate of the requestor" may further be determined from the privilege. The model illustrated by FIG. 3B is but one example of an entitlement framework and is not meant to limit the features and aspects described herein. For example, a variety of other components and/or aspects of a privilege may be added to the framework illustrated in FIG. 3B.

Referring again to FIG. 3A, each of objects 305, 310, 315, 320 and 325 may store one or more attributes of a privilege such as those described with respect to FIG. 3B. Other objects such as a user-role map object 335 and privilege-action map object 340 may also be implemented to provide information for tracking and managing associations between objects. As an example, user-role map object 335 provides a table of associations between users and roles. Thus, if an application using the privilege management system requested a list of all users associated with a certain role, one or more user-role map objects 335 may be accessed to retrieve such information. Similarly, if the application requested all privileges corresponding to a certain action, the information may be extracted using privilege-action map object 340.

Figure 4A:
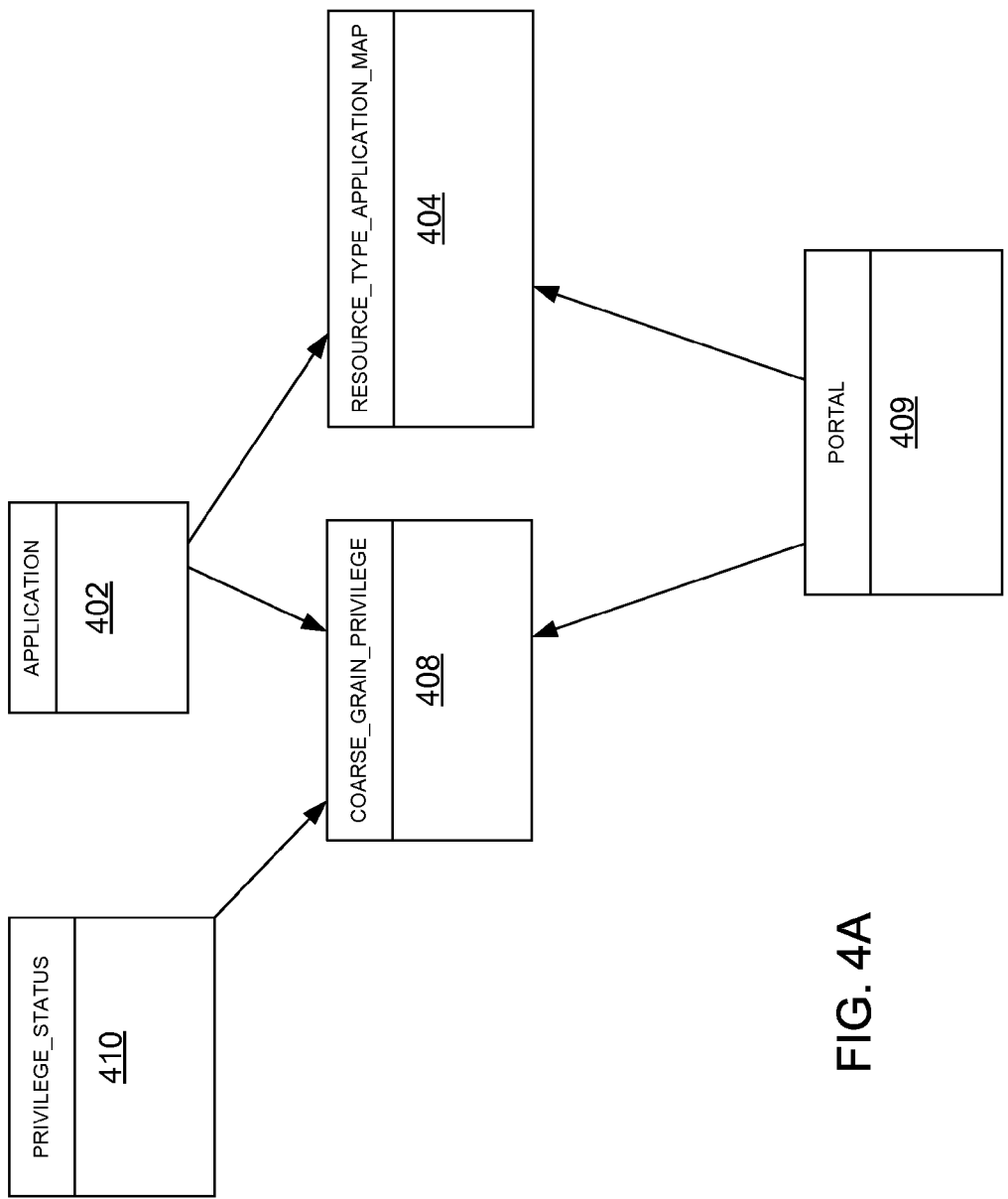
FIGS. 4A-4F are diagrams illustrating six categories of data structures and objects in a privilege management system according to one or more aspects described herein.

To describe the data model in additional detail, FIGS. 4A-4F group the objects and structures illustrated in FIG. 3A into functional categories such as Entitlements, Hierarchy, Privileges, Resource Type, Users and Roles, and Rules. For example, FIG. 4A is a diagram illustrating multiple objects and structures relating to entitlement functionality in a privilege management system. The Entitlement category includes multiple objects that drive a user experience by showing users the privileges they have at a high level (i.e., at the application level). In other words, objects and data structures 410, 402, 404, 408 and 409 upon which the Entitlement category is built provides a high level representation of privilege information stored for a user in the data model by resource type. This high level representation of the privilege information may further be stored in a coarse grain privilege object such as object 408. Entitlement functionality may be driven by objects such as application object 402, resource type-application map object 404, privilege status object 406, coarse grain privilege object 408 and portal object 409. Portal object 409 defines a web front end through which a user may access the applications to which one or more privileges for the user are associated and/or stored. Different portals may be defined for different applications. In one or more embodiments, different portals or web front ends may be defined for different instances of the same application depending on one or more application parameters. Application parameters may determine what resource types and/or privileges are available and provided to the user. Application parameters may include, for example, target items for which privileges may be defined and available actions that may be performed by a user. Each application may further be associated with a different portal based on differences in application needs and characteristics.

Additionally, application object 402 may identify a specific application to which a resource type or resource type object corresponds. Resource type-application map object 404, on the other hand, may be used to map relationships between resource types and corresponding applications. In one or more instances, an application may be associated with multiple resource types. For example, a particular transportation management application may correspond to a subway transportation resource type, an airline resource type and a ground transportation resource type. Alternatively, an application may be associated with multiple instances of the same resource type. The identification of resource types corresponding to an application may be facilitated by resource type-application map object 404. Map object 404 may store associations between resource types and one or more applications for fast look-up.

Coarse grain privilege object 408 defines categories or generalizations of privileges associated with an application or resource type. For example, a financial transaction application may be associated with fine grain privileges such as "deleting ID fields of financial records," "adding financial records" and "adjusting forecasts." Presenting a user interface or GUI with buttons or links that represent all of the fine grain privileges may, in some instances, overload the user with information. As such, coarse grain privilege object 408 defines one or more privileges categories or types of fine grain privileges that may be associated with links or buttons in a user interface. In the above example, the fine grain privileges may be associated with a coarse grain privilege that may be used to determine whether or not an option called "modifying financial records," is shown on the user interface or otherwise available. Thus, rather than processing three different privileges, a single coarse grain privilege may be used to determine the options to be presented to the user. Privilege status object 410 may specify whether a coarse grain privilege is available/active or not available/inactive for a particular user.

Figure 4B:
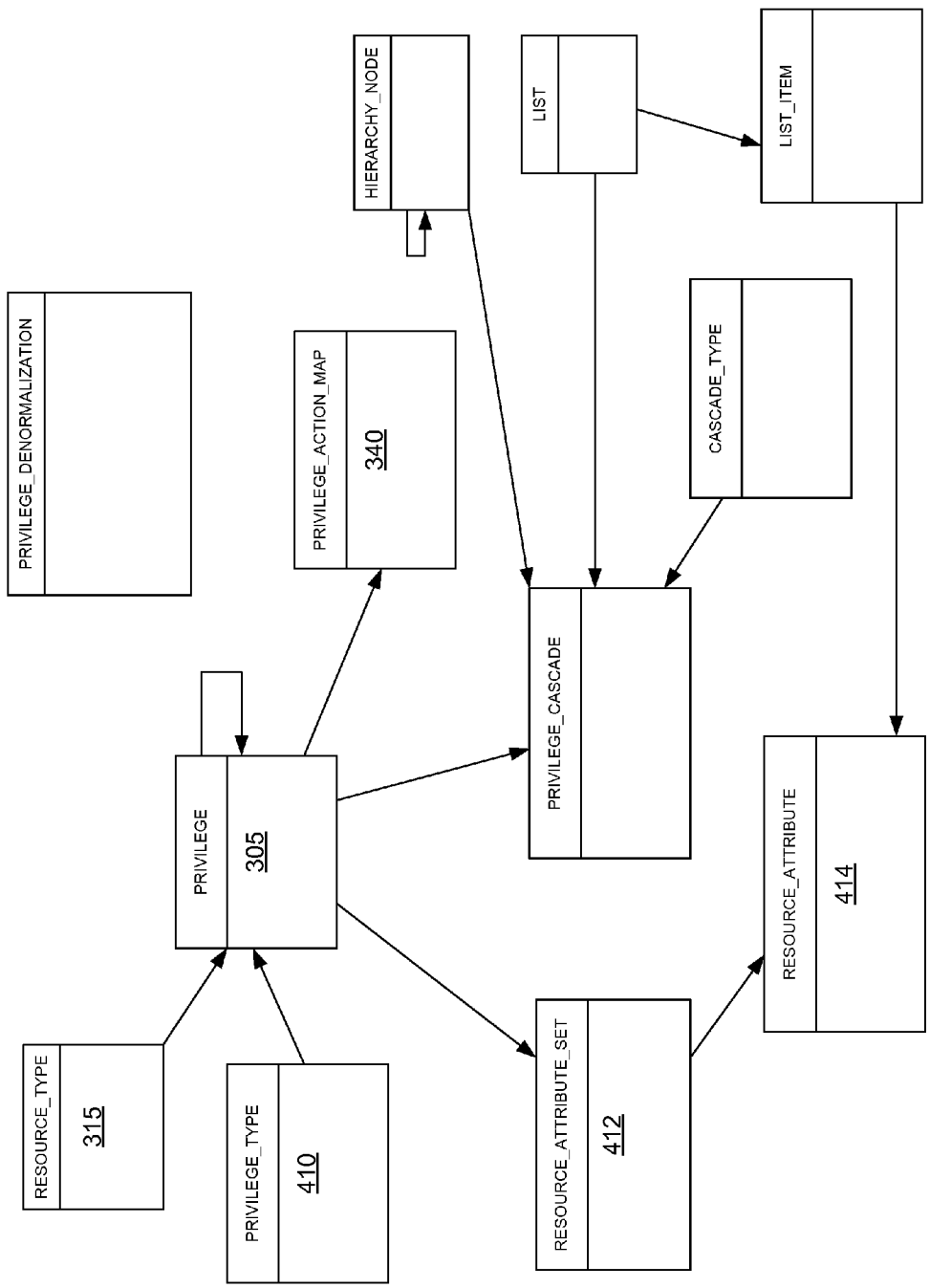

FIG. 4B illustrates a Privilege category, which may include multiple objects and structures that relate to the storage and representation of a privilege. In particular, privilege object 305 stores information and links related to various aspects and components of a privilege. For example, privilege object 305 may include fields that identify a user, a role and a privilege type corresponding to the privilege represented by privilege object 305. Privilege type object 410 may be used to define one or more privilege types, e.g., user and group type privileges. Privilege object 305 may further be associated with one or more resource attribute sets as defined by one or more resource attribute set objects 412. A resource attribute set may store one or more resource attributes represented by resource attribute object 414. Resource attribute sets may further be used as caching mechanisms for loading attributes associated with a privilege and expediting retrieval of attribute data.

In one or more arrangements, resource attribute object 414 may be used to define one or more attributes of a particular resource type associated with a privilege. The resource attribute may further define a relationship between a privilege and another object such as a hierarchy node. In such an instance, the relationship defined by the resource attribute may represent the inclusion of the hierarchy node in the privilege's scope. Resource attributes may further define relationships between list or target items and a privilege. In particular, a resource attribute may determine which list or target items are subject to the privilege. Accordingly, the scope of a privilege may be automatically redefined or adjusted based on one or more changes to objects with which the privilege has a relationship (e.g., a resource attribute, a hierarchy node and/or a list item). That is, no manual reconfiguration or redefinitions of the privilege or privilege object may be needed. Other resource attributes may also be defined and associated with privileges.

Further, privilege cascades defined by privilege cascade object 416 may be used to define or modify the scope of a privilege by adding hierarchy nodes and/or list items that have a specified characteristic. In one instance, the characteristic may include a relationship. In other words, additional hierarchy nodes or list items whose relationship with a selected node or item matches the relationship identified by the privilege cascade may be added to the scope of the privilege. For example, privilege cascades may be used to assign a privilege to a hierarchy node and all nodes subordinate to that node. In particular, a user may be given an option such as "All Children." In another example, a privilege cascade may provide a user the option (e.g., "All List") to apply a privilege to not only a particular list item but all other items in the same list as well. The privilege cascade option or shortcut may eliminate the need for an administrator to select and/or apply a privilege to each child node in a hierarchy. Thus, the data model may use privilege cascade object 416 to define and/or create the association between the explicitly granted privilege and the one or more privileges identified by the shortcut. Other types of characteristics may also be used in the privilege cascade including hierarchy type and node type.

According to one or more aspects, privilege cascading further allows automatic self-adjustment of a privilege in the event a new hierarchy node or list item is added. For example, a privilege cascade such as "All Children" may automatically associate newly added children node to a privilege in response to the addition. Similarly, a new target item added to a list to which a privilege is related may be automatically associated with the privilege based on the "All List" privilege cascade option. As such, manual redefinitions of the privilege or other components of the privilege might not be needed to adapt to newly added parameters using such a privilege cascade system.

Figure 4C:
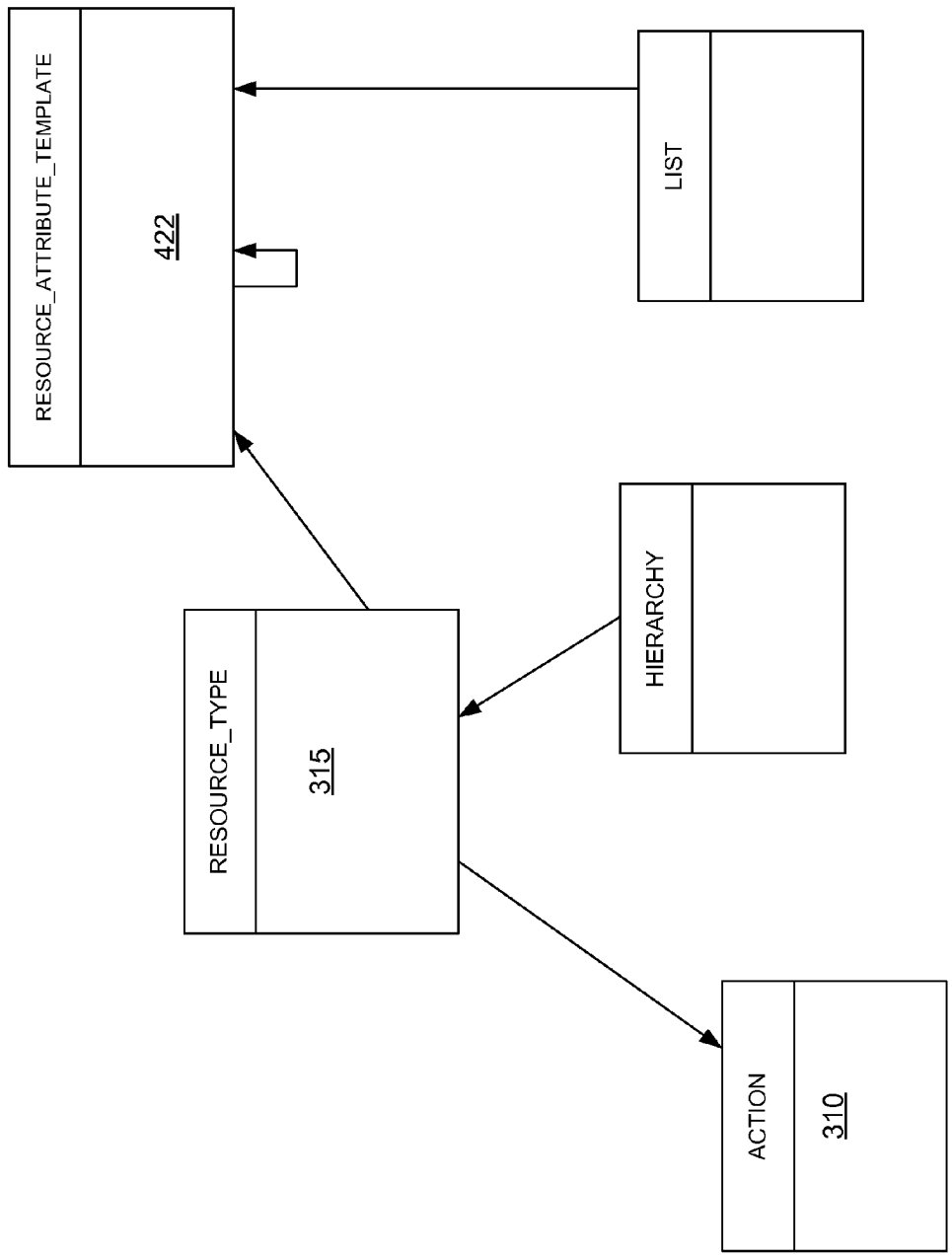

FIG. 4C illustrates objects and structures that relate to resource types. As discussed, resource types may be mapped to application types for which privileges may be defined. The data model may use action object 310 to define one or more actions that are available for the resource type. For example, an employee management application may include commands relating to shift assignment, adding/removing employees, modifying pay and the like. As such, each of the aforementioned actions may be added to the resource type while actions such as export or translate might not. Additionally, resource attributes related to a particular resource type may be defined based on a resource attribute template object such as template object 422. Resource attribute templates define attributes that are to be defined for a given resource type. Thus, a privilege defined for the given resource type may be required to define all of the attributes specified by the template.

In one or more configurations, the resource attribute template may include a nullability flag that defines whether an attribute has to be defined. A resource attribute template may also include a grantable flag that specifies whether a privilege may be granted to the resource attribute. For example, in a public works system, privileges might not be grantable to an attribute corresponding to a state hierarchy node, but may be grantable to an attribute corresponding to a city hierarchy node. Such a configuration may be useful to prevent over-broad privilege definitions. The template may further provide specifications as to data format and storage format. In particular, template object 422 may specify one or more required fields, maximum data sizes for each of the fields, data types and/or combinations thereof. Relationships between resource attributes such as parent and child may also be defined by the resource attribute template.

Figure 4D:
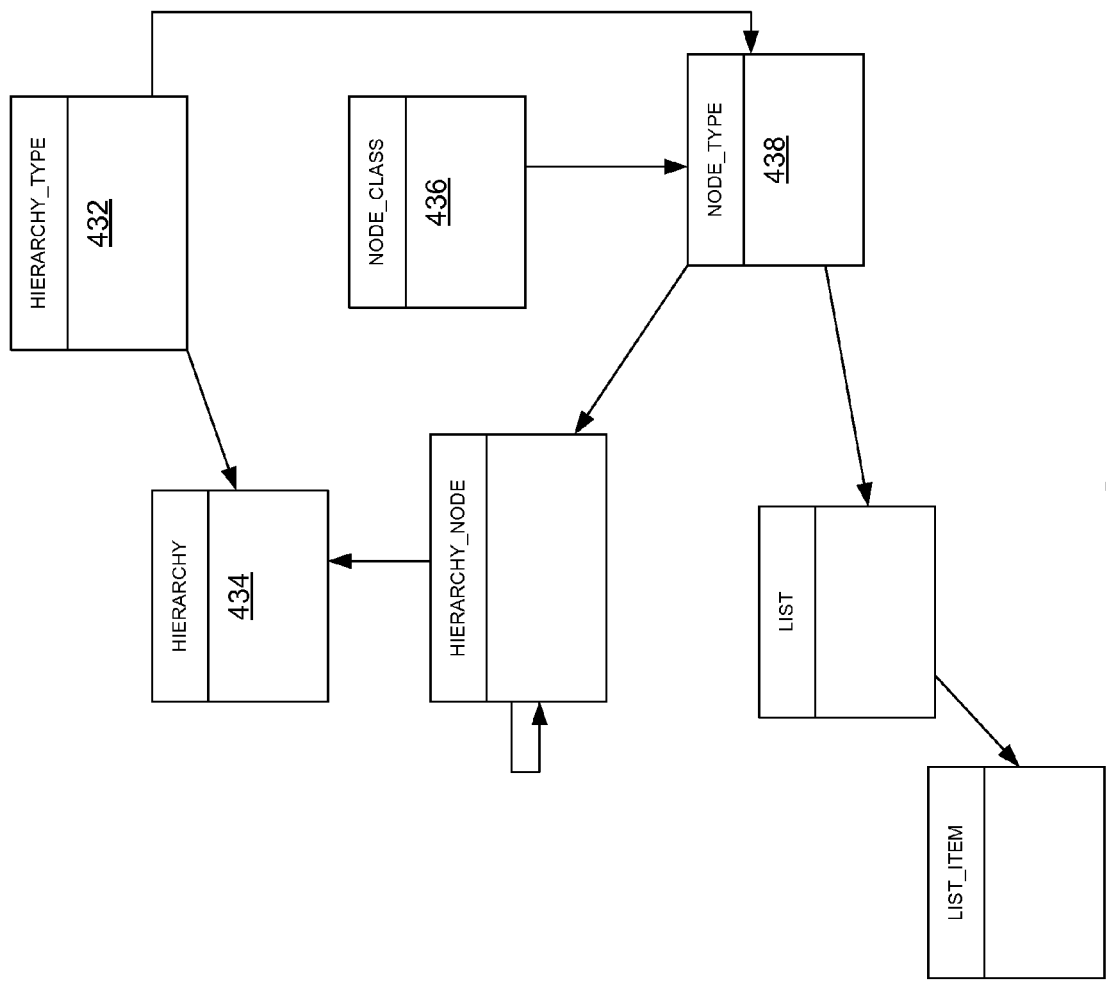

Data objects and structures for implementing hierarchies and lists are illustrated in FIG. 4D. Lists generally relate to a collection of objects, target items and/or other information. Hierarchies, on the other hand, generally refer to collections of objects, data and/or other information, wherein the information is ranked or ordered according to one or more characteristics. Hierarchies and lists may be used independent of one another or, alternatively, may be employed in combination. For example, different levels of a hierarchy may be associated with different lists of actionable items. Thus, a privilege of a first hierarchy level may be permitted to act on a certain list of items while a privilege of a second hierarchy level may be permitted to act on a different list of items. Further, node class object 436 may be used to differentiate between hierarchy nodes and list nodes. In addition, nodes within a hierarchy and/or list may be further defined by a node type corresponding to a node type object 438. For example, nodes in a geographic hierarchy (e.g., country, state, city) may have a node type of geography. Similarly, hierarchies may also be characterized by a type variable (e.g., Hierarchy_Type_ID) corresponding to hierarchy type object 432. Hierarchy types may be defined by a user and may include geographic hierarchies, security hierarchies, position hierarchies and the like. Hierarchies may further be identified by a hierarchy identifier variable (e.g., Hierarchy_ID).

Figure 4E:
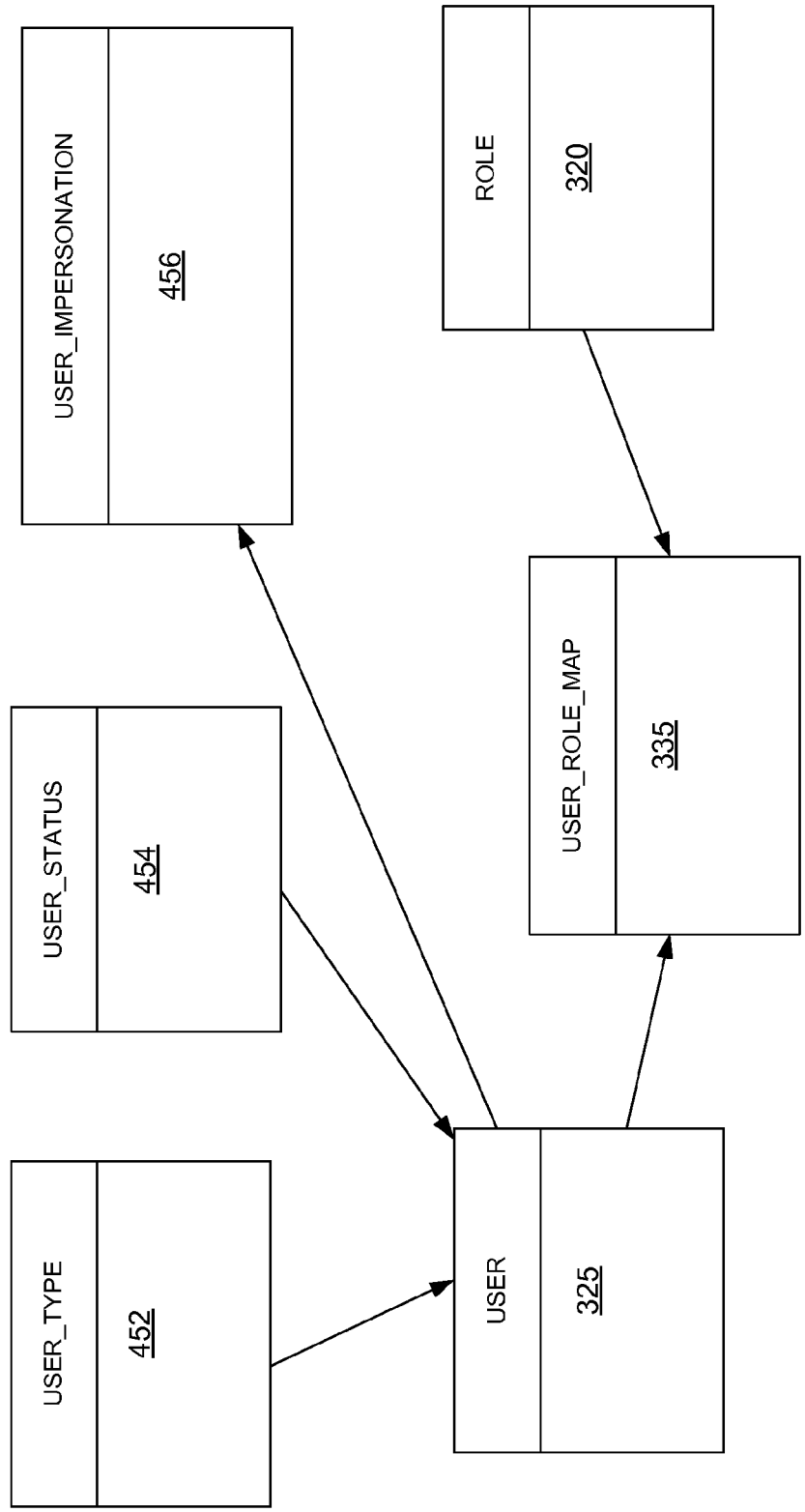

FIG. 4E illustrates a users and roles diagram showing several objects and structures 320, 325, 335, 452, 454 and 456 used for implementing and/or supporting user and role components of a privilege in a privilege management system. User object 325 may store a variety of fields including a user identifier, address information, phone number data, email information and the like. User object 325 may further be characterized and/or classified according to a user type and a user status defined by user type object 452 and user status object 454, respectively. Examples of user statuses include active user, inactive user and deleted user while examples of user types may include internal and external types of users. The privilege management system may further include user impersonation objects such as user impersonation object 456 that allow a first user to act as a second user. The first user may inherit one or more privileges of the second user subject to one or more conditions. Accordingly, user impersonation object 456 may store data including a first user identifier (e.g., User_ID) and a second user identifier (e.g., User_Impersonation_ID), where the second user identifier identifies a user impersonating (i.e., acting under the authority of) the first user. User impersonation object 456 may further include an effective date and an expiration date to define a period for which the impersonation is valid.

As discussed, users and roles may further be linked by a user role map as defined by user role-map object 335. User role-map object 335 stores a correspondence or association between a user and a particular role. Thus, if user Liz were to act as the Human Resources Manager in an organization, a privilege management system may associate user Liz with the role of Human Resources Manager using user-role map object 335. Role objects like role object 320 may include fields that store information such as a role name, a role description and an expiration date. Like user impersonations and roles, user-role associations may also include an expiration date and/or an effective date to ensure that associations are not outdated.

Figure 4F:
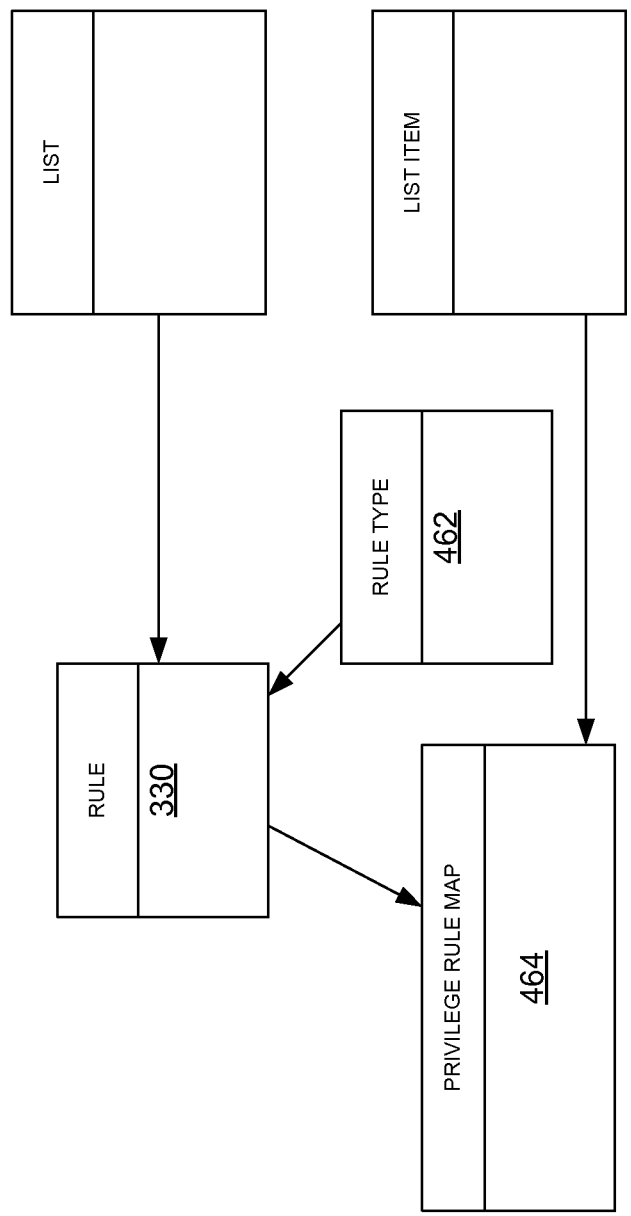

FIG. 4F illustrates a privilege rule diagram including rule object 330, rule type object 462 and privilege rule map object 464. Rule object 330 may define one or more rules or conditions that qualify a privilege. For example, a financial data modification privilege may be conditioned on a time of day or a level of security. The time of day condition may thus be defined as a rule that qualifies the financial data modification privilege. The privilege(s) and rule(s) may be associated using privilege rule map object 464. In one or more configurations, multiple rules may be defined for a single privilege. The rules may be stored in a list as list items. Rules may further be categorized or classified by one or more rules types defined by rule type object 462. Rules types may include, for example, effective date ranges, effective time ranges, greater than/less than date, numeric range, list item conditions, value list conditions, greater than/less than qualifications and text matches.

Further, according to one or more aspects, a privilege may be validated for a user or role based on an evaluation of a privilege rule. For example, a privilege rule may condition the validity of a user's privilege on whether the user is assigned to a first department role. This privilege may for ordering books or some other item. As such, if the user's role changes, the user's privilege for ordering books would be invalidated. In other words, the user's privileges changes. The user's privileges are dynamic and self adjusting based on the privilege rule.

FIGS. 5A-E illustrate the creation and definition of a privilege in accordance with various aspects of the architectures and models described herein. For example, in FIG. 5A, a hierarchy may be created using hierarchy object 501, hierarchy type object 504, node class object 515, node type object 511, list object 513, list item object 514 and hierarchy node object 507. Hierarchy object 501 may define a hierarchy having a Hierarchy_ID of 1000 and a Hierarchy_Type_ID of 1000. The Hierarchy_Type_ID may identify and/or correspond to a geographical hierarchy type defined by hierarchy type object 504. Additionally, the hierarchy may be associated with multiple hierarchy nodes 507a, 507b and 507c corresponding to various levels or elements of the hierarchy. Each node 507a, 507b and 507c may also be characterized by one or more node types defined by node type object 511. Each node 507a, 507b and 507c may further specify a depth parameter for identifying a level in the hierarchy to which the node belongs or is assigned. For example, node type object 511 may define node types such as planet, country, state, city and grid. Each node 507a, 507b and 507c may thus be identified as one of the node types. Node 507a, for instance, corresponds to a planet node type (as specified by the Node_Type_ID field and value) while node 507b corresponds to a country node type.

Hierarchy nodes may further contain fields such as a node name, a parent hierarchy node id and a root hierarchy node id. A parent hierarchy node id may be used to define relationships between nodes in the hierarchy. Accordingly, hierarchy node 507a, in one or more instances, may be defined as the parent hierarchy node of hierarchy node 507b. Each node 507a, 507b and 507c may further specify a hierarchy root node in a root_hierarchy_node_ID. A node may be identified as a list node or a hierarchy node by specifying a node class id or value defined by node class object 515. In one or more arrangements, a node type may be associated with a list of list items for which the privilege applies defined by list object 513 and list item object 514. In one example, the list may contain list items such as electric grid, water grid and road grid.

FIG. 5B illustrates the definition of a resource type and resource attribute template associated therewith. Resource type object 519 may define a particular resource type such as a public works system. Resource type object 519 may further identify one or more associated hierarchies which may be used to structure the use and/or application of privileges corresponding to the resource type. The resource type may further define required attributes using one or more attribute templates defined by resource attribute template object 523. Such templates may define a list of attributes that must be defined for privileges associated with the resource type. Templates may specify which attributes are required and which are not required using a nullability field as described herein. Each template may also identify parent resource attribute template to characterize relationships between resource attributes. According to one or more aspects, resource attribute templates may be associated with a specific resource type based on a Resource_Type_ID field in resource attribute template object 523.

Figure 5A:
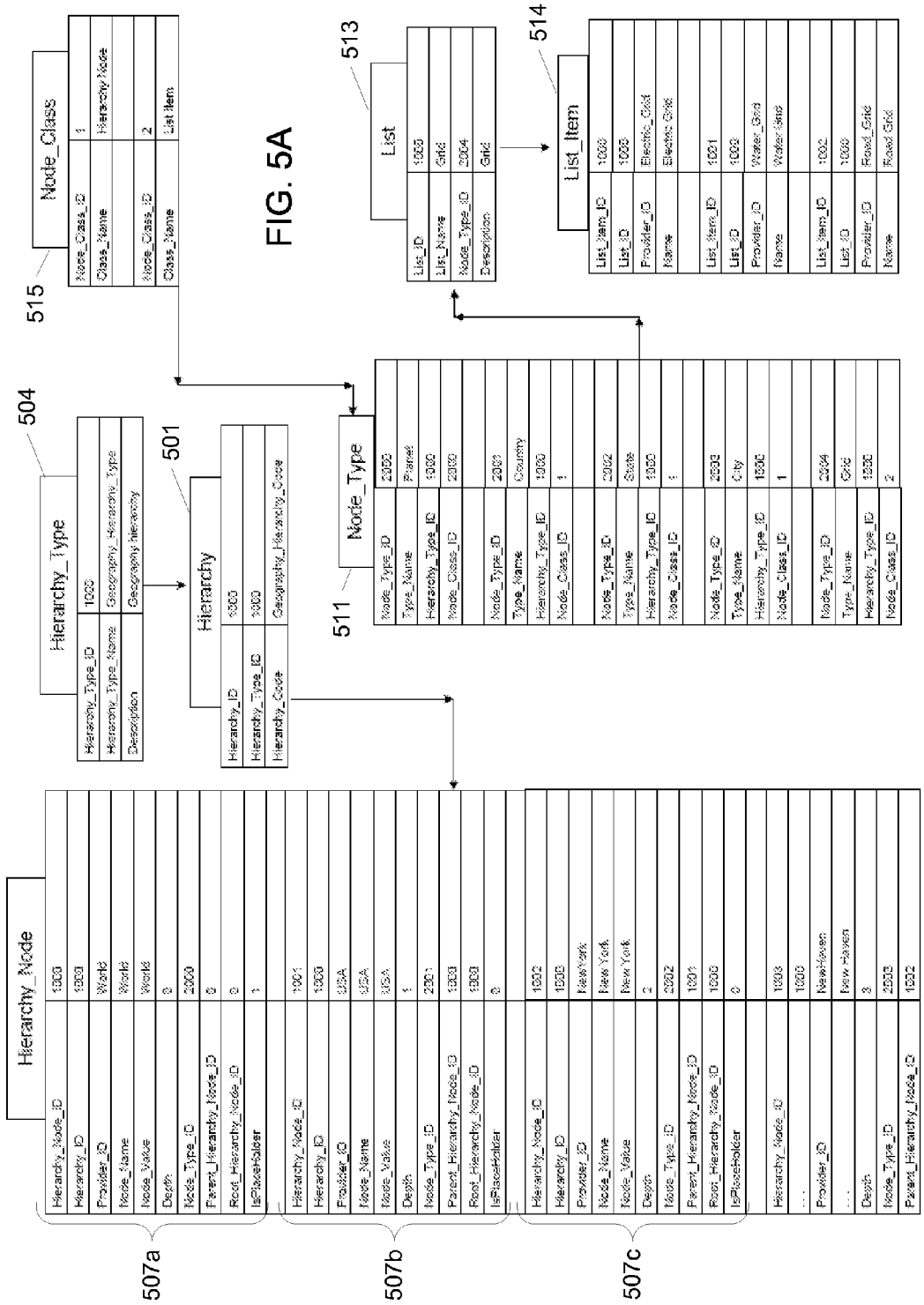
Figure 5C:
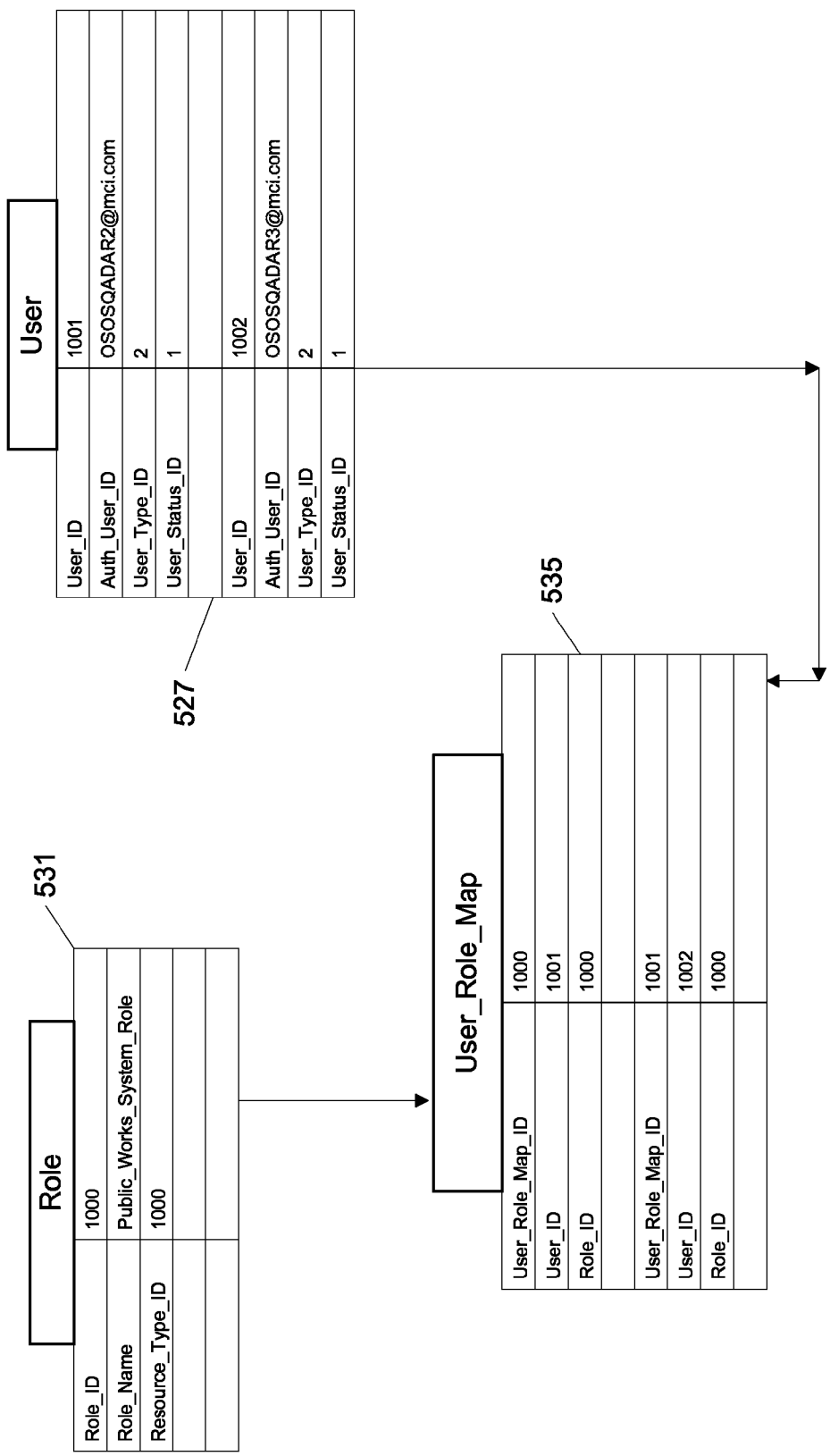

FIG. 5C illustrates users, roles and user-role maps defined by user object 527, role object 531 and user-role map object 535, respectively. Each of role object 531 and user object 527 may define one or more roles and users, respectively. For example, in FIG. 5C, user object 527 defines two users, one assigned a user id of 1001 and the other assigned a user id of 1002. Roles may specify a user's role in an organization or a particular responsibility he or she holds. Role object 531 defines a public works system role associated with tasks corresponding to the public works system (rather than, e.g., a water works or road works system). User-role map object 535 may be used to associate a user with a role. For example, user-role map object 535 may define an association between the user corresponding to user id 1001 and the public works system role.

Figure 5D:
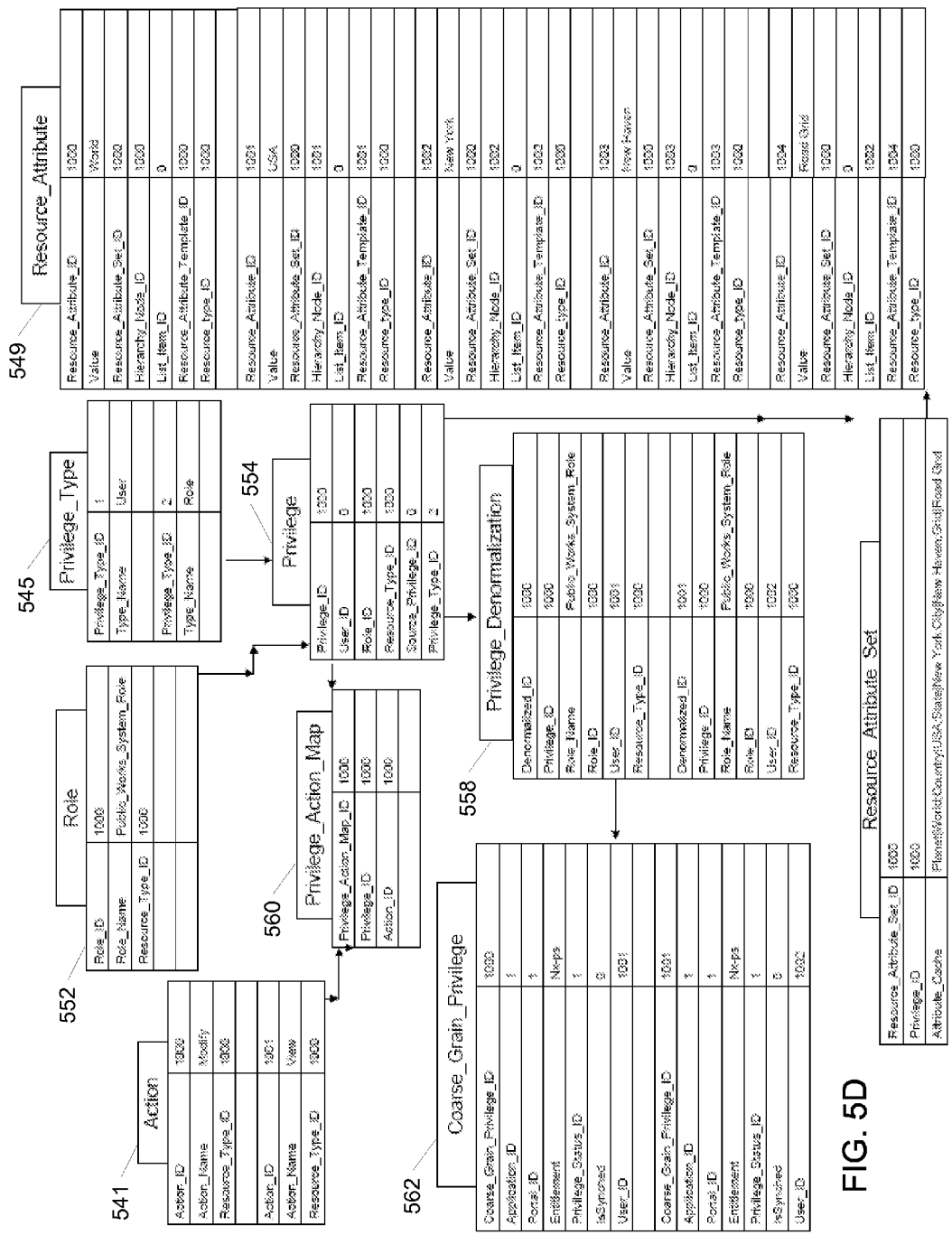

In FIG. 5D, a privilege may be defined based on a role. That is, the privilege is assigned to a role (e.g., the public works system role defined by role object 552) that may be assigned to one or more users. The privilege may be stored in privilege object 554 and correspond to an action, a privilege type and/or a set of resource attributes. Actions such as modify and view may be defined and stored by action object 541 while privilege types including user and role may be defined and stored by privilege type object 545. Associations between an action and a privilege may be defined and/or stored by privilege action map object 560. A user associated with the role specified in privilege object 554 (i.e., role identified by role_id 1000) may be permitted to perform the defined action. Use of a privilege action map further allows for the automatic redefinition and/or reconfiguration of actions associated with a privilege without manually or specifically modifying the parameters of the privilege. Further, resource attribute object 549 may be used to characterize a privilege or a resource type. For example, resource attribute object 549 may store attributes that designate a hierarchy node assignment. In particular, a privilege may be associated with a hierarchy node or level by associating the privilege with the corresponding resource attribute. Additionally, privilege denormalization object 558 may be used to define a correspondence between a fine grain privilege defined by privilege object 554 and a coarse grain privilege. Coarse grain privileges may be defined for each individual user associated with the specified role using coarse grain privilege object 562. As such, coarse grain privilege object 554 may store two coarse grain privileges, one for each user (users 1001 and 1002) associated with the specified role. As discussed, coarse grain privileges may represent a broad characterization or categorization of fine grain privileges. In particular, privileges may be abstracted out or categorized into an action and a generic list item. For example, a coarse grain privilege such as "view orders" may be defined for a user having multiple privileges such as "view orders for music department," "view orders for audio department," and "view orders for computer department." Thus, the coarse grain privilege "view orders" may link the user to the individual view order privileges corresponding to different departments. In another example, privileges relating to adding, deleting and revising list items may be grouped into a "modify" coarse grain privilege. In another example, fine grain privileges such as review, print and save may be categorized into a "view" coarse grain privilege.

Figure 5E:
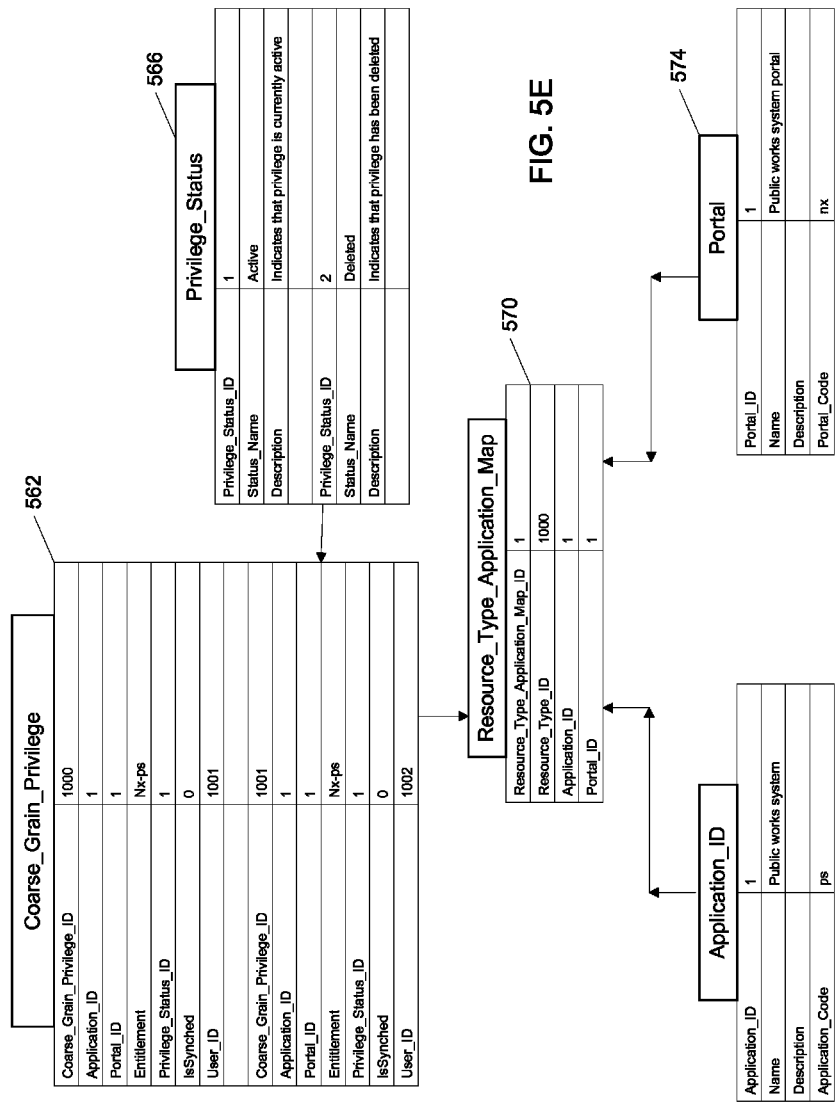

FIG. 5E illustrates a coarse grain privilege definitions based on coarse grain privilege object 562. Particularly, coarse grain privilege object 562 defines two coarse grain privileges, i.e., coarse grain privilege id 1000 and 1001. Privilege status object 566 may be used to characterize that status of coarse grain privileges. In one example, privilege statuses may include active and in active. Resource type application map object 570, on the other hand, may define associations between a resource type and an application. Such associations permit a user or privilege manager to view and/or identify resource types and privileges associated with a particular application and vice versa. For example, resource type application map object 570 may store a correspondence between a public works system resource type (i.e., resource type id 1000) and a public works system application (i.e., application id 1). In one or more configurations, a portal may also be defined that creates a user interface for facilitating access of privileges. For example, a portal may used to display available coarse grain privileges associated with multiple different applications to a user. Portals may be defined using portal object 574.

Figure 6A:
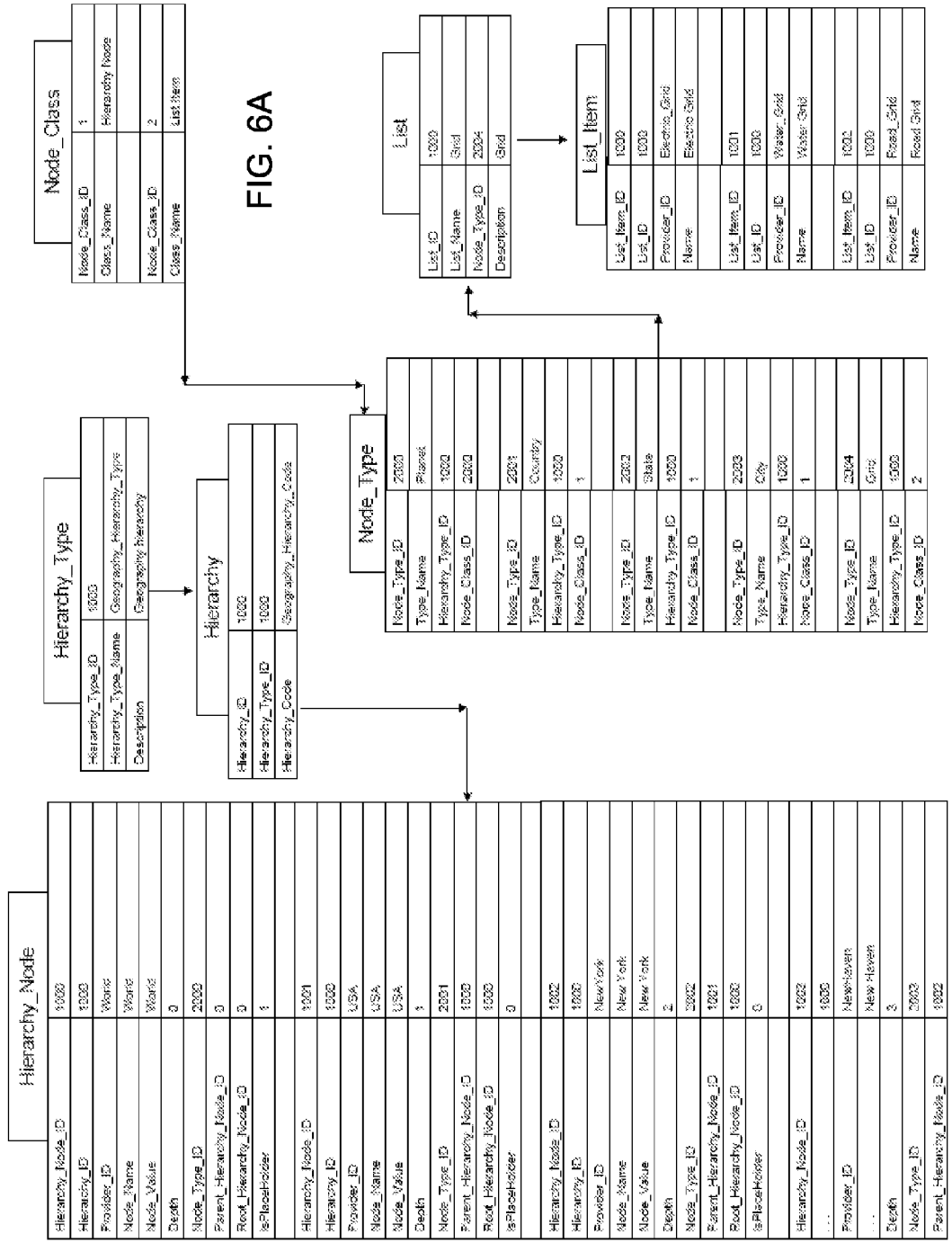
FIGS. 6A-6D are diagrams illustrating the creation and definition of user-based privileges and associated objects according to one or more aspects described herein.
Figure 6B:
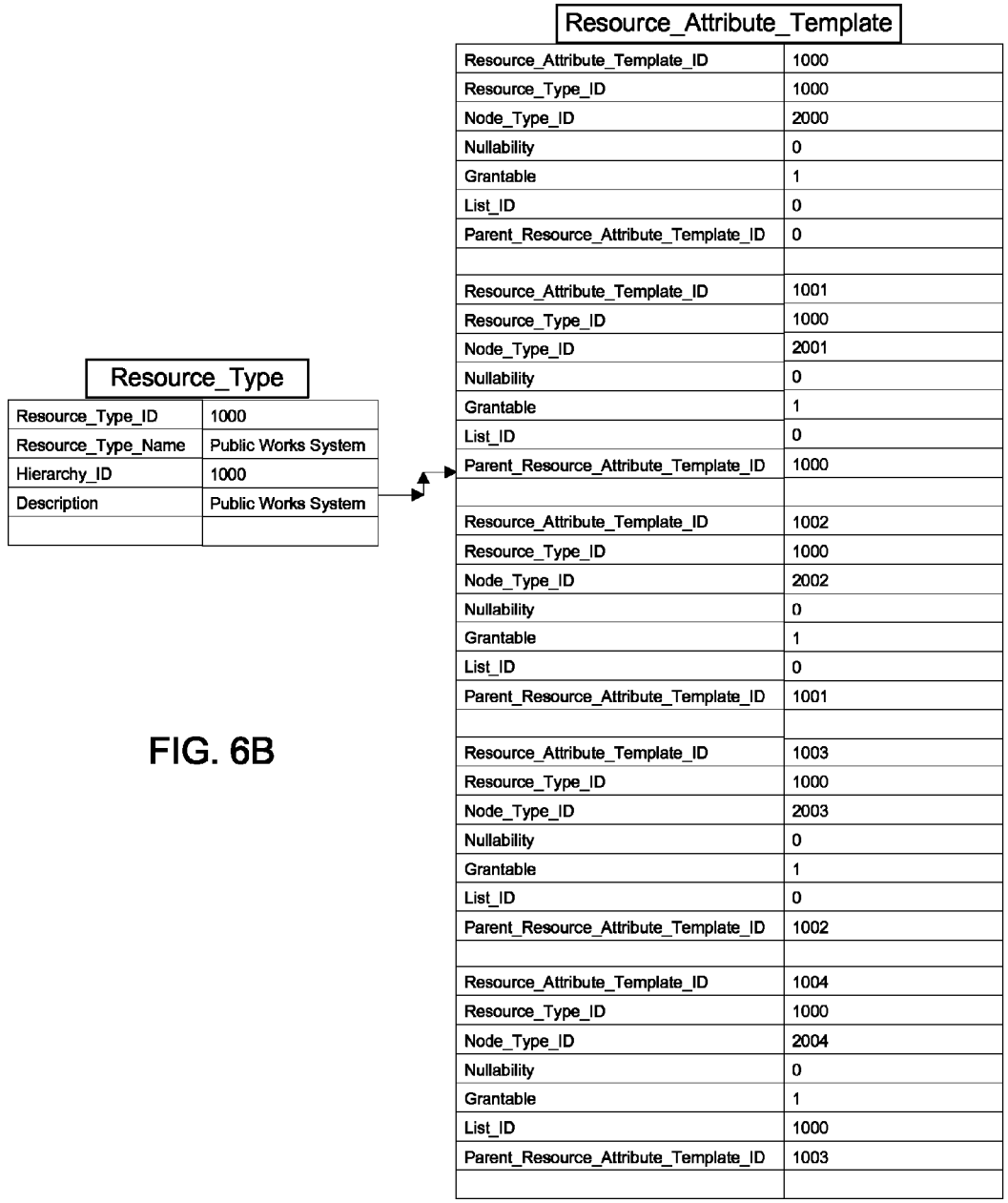
Figure 6C:
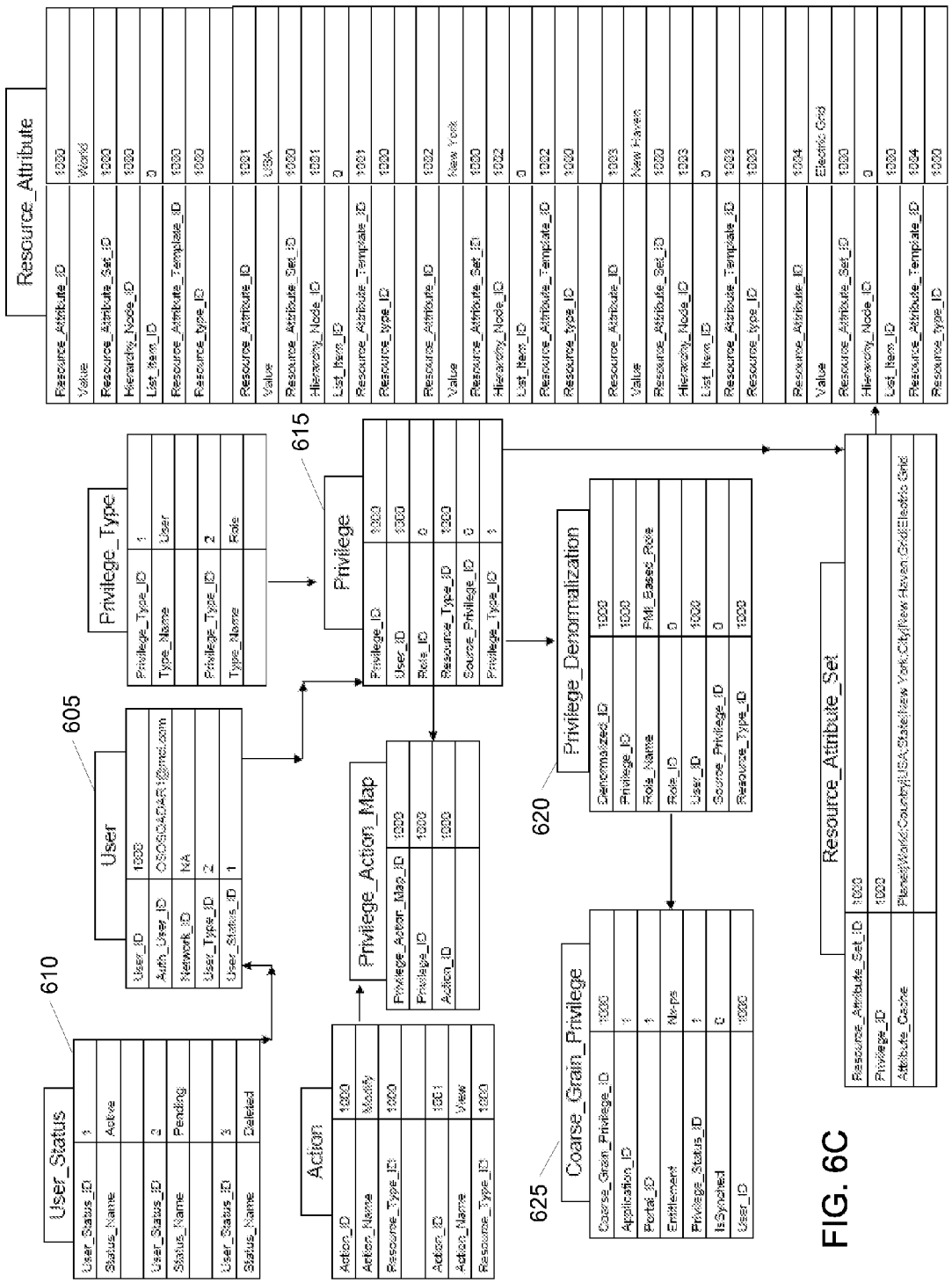
Figure 6D:
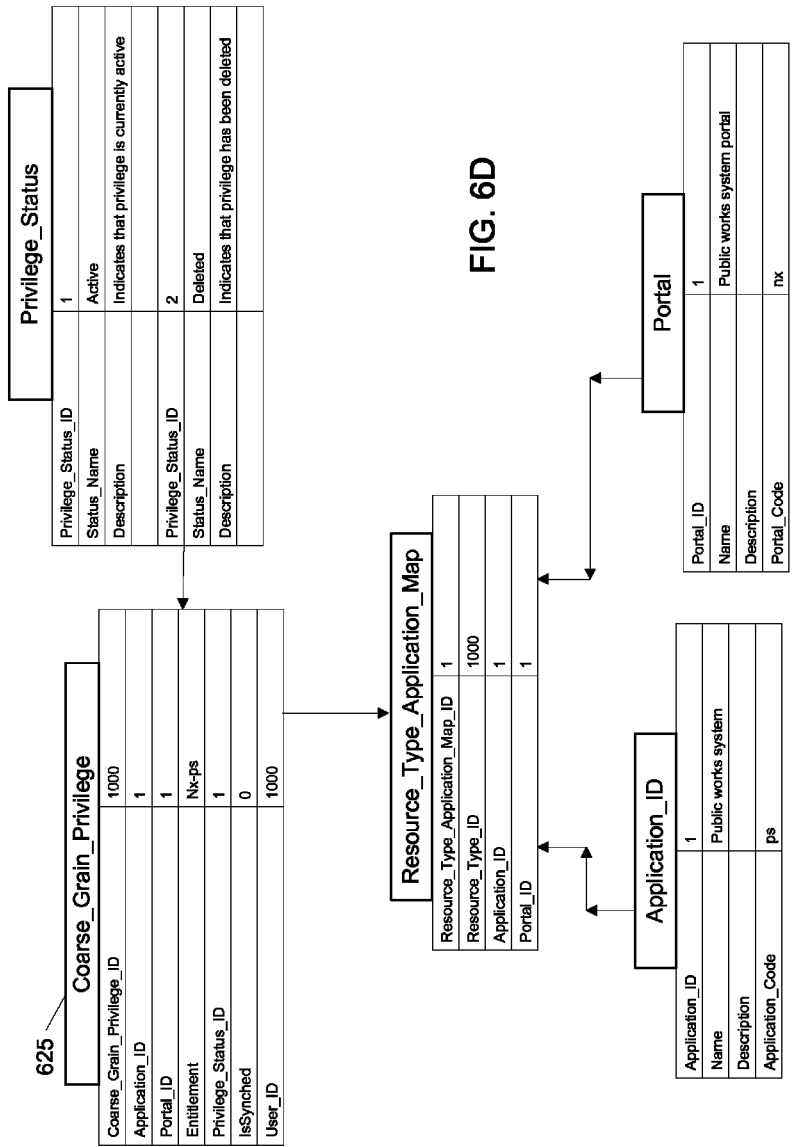

FIGS. 6A-6D illustrate another example of a privilege definition. In contrast to FIGS. 5A-5E, however, the privilege definition of FIGS. 6A-6D is based on users rather than roles. In particular, FIG. 6C illustrates the creation of a privilege based on a user defined by user object 605 and user status object 610 while FIG. 6D illustrates the definition of coarse grain privileges. A user may be defined and/or stored by user object 605 and may further be characterized by user statuses such as active, pending and/or deleted. Accordingly, privilege object 615 may identify a user corresponding to user object 605 rather than identifying a role. Similarly, privilege denormalization object 620 may associate coarse grain privileges with fine grain privileges based on the specified user rather than a role. Accordingly, coarse grain privilege object 625 might only create one coarse grain privilege definition for the single user identified by privilege object 615 (i.e., user associated with user_id 1000) as is illustrated in FIGS. 6C and 6D. In contrast to FIGS. 5D & 5E, coarse grain privileges might only be defined for a single user, since the privilege illustrated in FIGS. 6A-6D is not defined based on a role that encompasses more than one user. FIG. 6A illustrates the definition of hierarchies and lists while FIG. 6B illustrates the definition of resource types. Hierarchies, lists and resource types may be created and/or defined for user-based privileges in substantially the same manner as for role-based privileges.

Figure 7A:
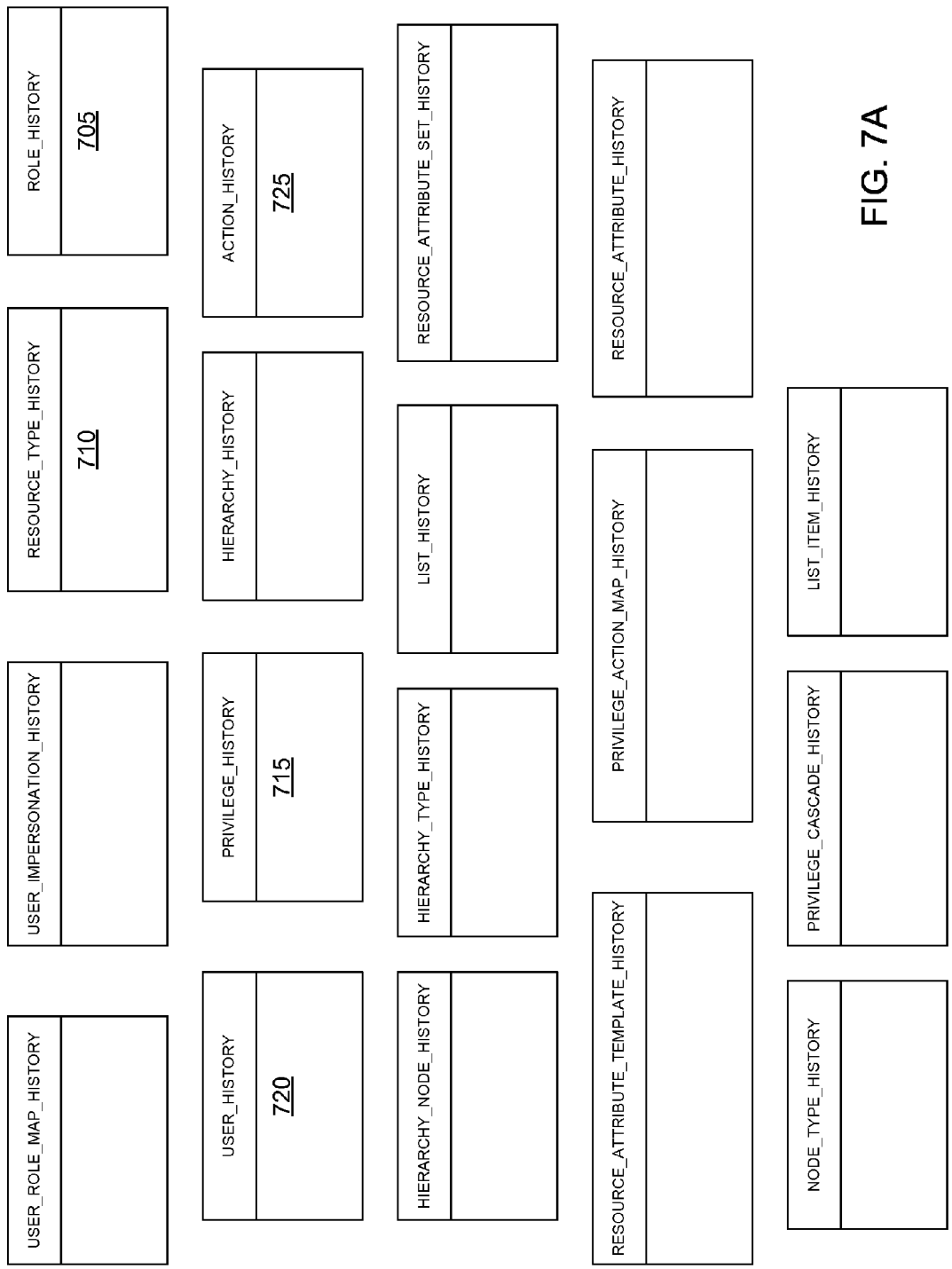
FIGS. 7A-7C are diagrams illustrating three categories of support and maintenance data structures and objects according to one or more aspects described herein.

The data objects, structures and methods discussed herein may further be supported and/or managed using one or more maintenance objects including history table objects, error logging and tracking objects and resource import objects. FIG. 7A illustrates a variety of history table objects that may be used to track and log certain events that occur with respect to one or more other objects. For example, role history 705 may be used to track actions and/or status information relating to a particular role or role object. Similarly, resource type history object 710 may store historical data relating to modifications made to a particular resource type or resource type object. Other history objects may include privilege history object 715, user history object 720 and action history object 725 among others. Events and information may be logged in response to a trigger or predefined rule. For example, a resource type history object 710 may add an entry in response to detecting a change to a resource type. Each of table and history objects 705, 710, 715 and 720 may further be retrieved by a user to audit or otherwise analyze the changes that have been made to the privilege system.

Figure 7B:
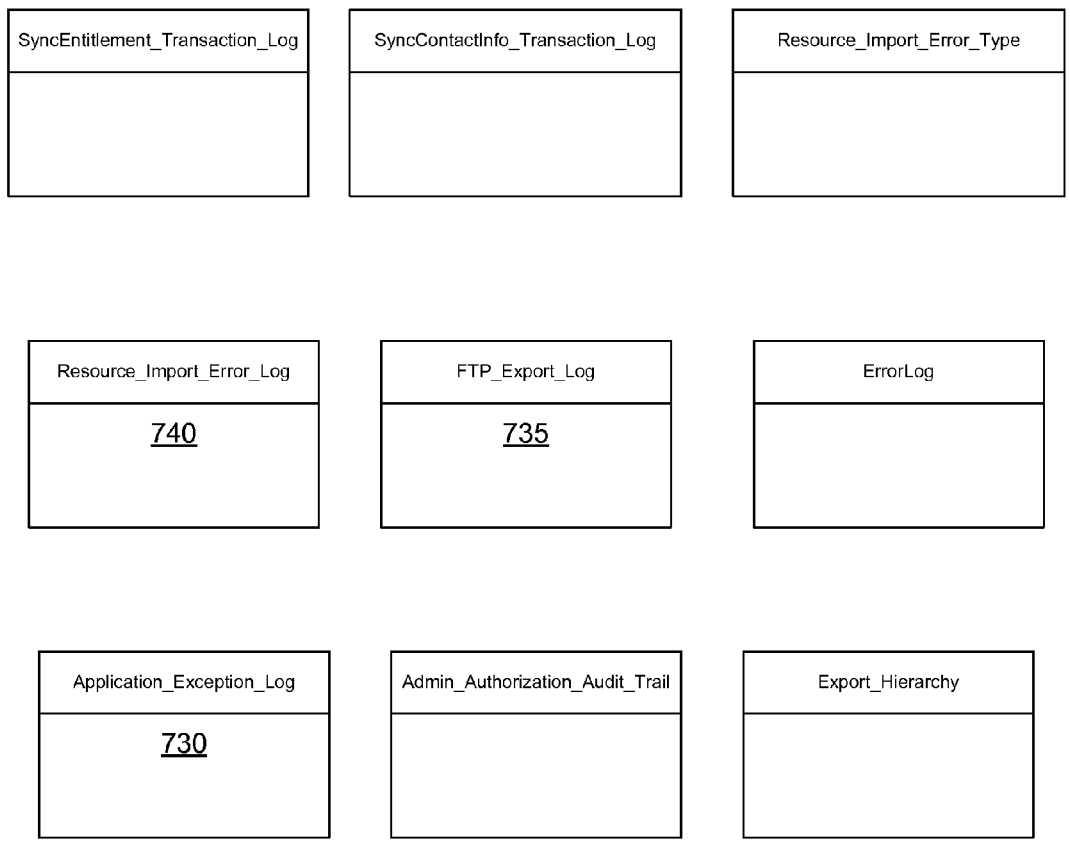

FIG. 7B illustrates several error logging and activity tracking objects. Each error logging and activity tracking log object relates to a different type of log. For example, application exception log object 730 may be used to store a log of all exceptions generated in response an application command and/or request. FTP export log object 735, on the other hand, may be used to construct logs identifying ftp export activity from the privilege management system. In yet another example, resource import error log object 740 may be used to store errors that are encountered during importation of a particular resource type. One of skill in the art will appreciate that a variety of activities and errors may be tracked using such objects and additional log objects may be added to track other errors and activities. Again, logging and activity tracking objects 730, 735 and 740 may respond to triggers, predefined rules and/or events defined within the system.

Figure 7C:
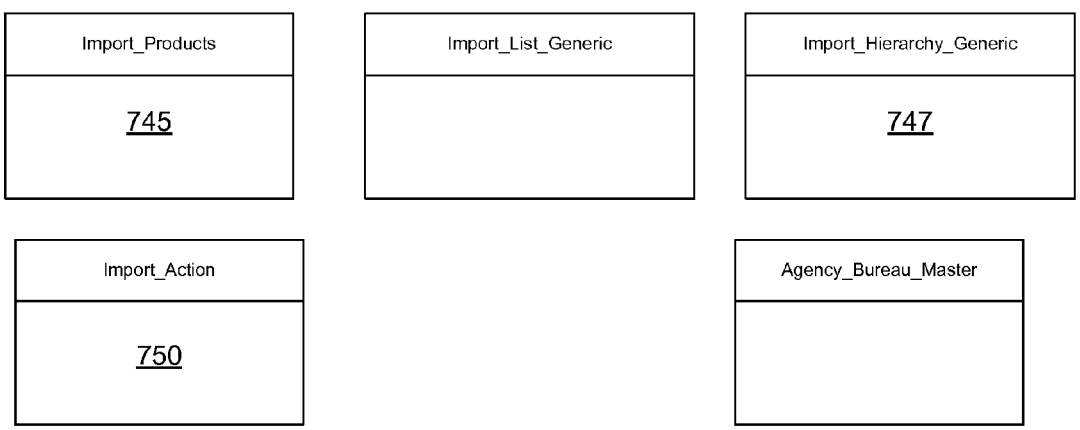

FIG. 7C illustrates a diagram showing resource import objects that are used to maintain a master list of various types of data used and/or stored within the system. For example, import hierarchy object 747 may store data relating to one or more hierarchies represented within the privilege management system. Similarly, import action object may correspond to a table or list of actions that are defined by the system. In one or more arrangements, master lists and/or tables may be used as control lists for validating import files during an ETL process. An import products table or object such as import products object 745, on the other hand, may be used to import lists of target items and/or hierarchys in order to determine changes to be made to the privileges. For example, if new target items are added to an application or resource type, these new target items may be identified by importing a master list of products and comparing the master list with the current lists used in the privilege management system. In accordance with one or more determined differences, one or more item lists associated with affected privileges may be updated (e.g., adding or deleting items from the lists). Import action object 750 may serve a similar function for updating and detecting changes to actions associated with an application or resource type. Further, changes to privileges may be tracked and logged in a privilege delta export file. This file may be sent to applications or made available to an administrator or user.

Each of the aforementioned maintenance objects may be used for a variety of purposes including auditing and error checking. The objects may also be used for loading data into one or more other objects such as those illustrated in FIGS. 4A-4E. Further, one or more of the above maintenance objects may further store before and after values so that a user may perform debugging functions. For example, a tracking object such as those illustrated in FIG. 7B may be used to log changes made to one or more privileges based on newly imported data. These changes may be saved to a privilege delta export files (e.g., a file storing privileges that have changed in the previous 4 hours). The files may then be transmitted to one or more relevant applications.

Figure 8:
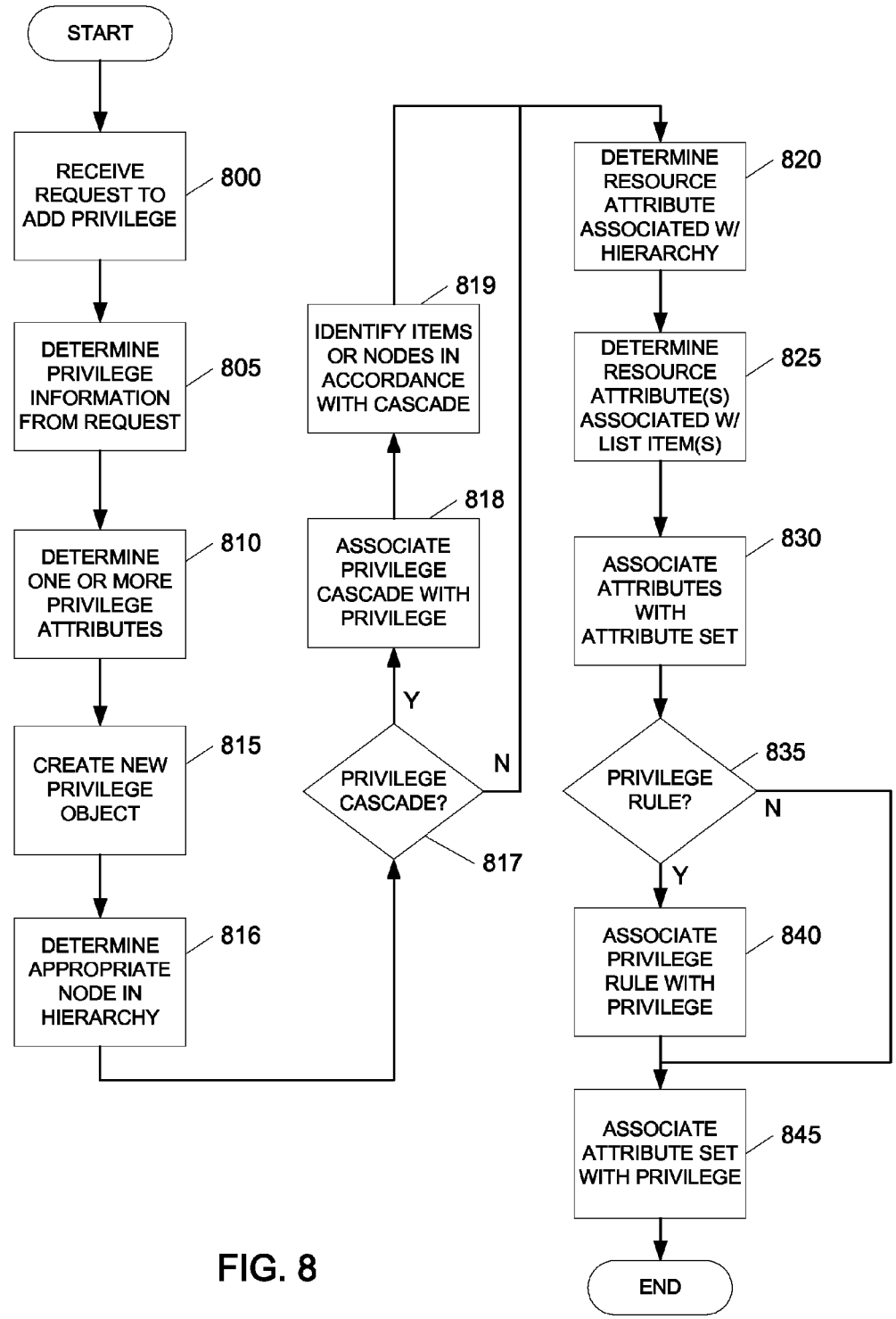
FIG. 8 is a flowchart illustrating a method for adding and implementing a privilege according to one or more aspects described herein.

FIG. 8 illustrates a method for implementing a privilege in a privilege management system. A privilege may be defined by a user and/or automatically implemented by the management system based on related privilege information. Alternatively or additionally, privileges may be added through a web service or a management console user interface. For example, a request to add a privilege may be received by the privilege management system in step 800. The request may, for example, be received from a user through a web services gateway such as gateway 220 (FIG. 2). From the request, one or more types of information may be extracted or otherwise determined in step 805. The various types of information may include list item information, action information, user data, role data, hierarchy information and the like.

In step 810, a new privilege object may be created to store the new privilege and to establish associations between the various attributes and data objects corresponding to the privilege. In step 815, for example, objects such as action objects and role objects may be associated with the privilege object. Linkages between objects may be built based on dependencies and relationships between the objects and/or the data stored therein. In one or more embodiments, relationships and linkages may be defined as resource attributes stored in a resource attribute object.

In step 816, the system may determine where in a hierarchy the privilege is to be associated. This determination may be made by user input or based on a default hierarchy level. In step 817, the system may determine whether a user wishes to define a privilege cascade. A user may specify a relationship or characteristic used to identify one or more additional or other hierarchy nodes or list items to which the privilege is to be associated. For example, if a user selected an "All Children" privilege cascade option, the system may identify one or more nodes that are children of the level or node determined in step 816. If a privilege cascade is selected, the privilege cascade may be associated with the privilege in step 818. Further, in step 819, one or more nodes or items matching the characteristic or relationship specified by the privilege cascade may be identified.

In step 820, a corresponding resource attribute may be determined for each of the hierarchy nodes to which the privilege applies. The nodes may include an explicitly user-selected node and/or nodes implicitly selected through a privilege cascade. In step 825, corresponding resource attributes may be determines for list items to which to which the privilege applies. For example, a privilege may allow a user to view different types of data. As such, each of those types of data may be represented by a resource attribute and associated with the privilege. Again, list items may be explicitly selected by a user or implicitly selected via a privilege cascade. In step 830, the resource attributes corresponding to the privilege may be linked, stored or otherwise associated in a resource attribute set. In step 835, the system may determine whether one or more privilege rules have been defined or created. If so, the privilege may be associated with the privilege in step 840. In one or more configurations, the privilege rules may be assigned to one or more nodes associated with the privilege. Privilege rules may qualify a privilege by defining certain conditions under which the privilege applies to or may be exercised by a user. In one or more instances, whether a privilege is valid for a user may depend on user characteristics (e.g., role) as applied to the privilege rule(s). For example a privilege rule may specify that electronics orders may be performed during the hours of 6 A.M. to 6 P.M. In another example, a privilege for ordering financial reports may be conditioned on whether the user has a management role. As such, if a user's role changes, the privilege for ordering financial reports might no longer be valid for that user. In step 845, the attributes or attribute set may further be associated to the privilege to characterize one or more parameters (e.g., hierarchy level and/or target list item) of the privilege.

According to one or more aspects, data from history table objects, error logging and tracking objects, and/or resource import objects may be retrieved for a manager or user to review and/or analyze. Logs may also be extracted from one or more error logging and tracking objects for a debugging interface and/or functions. A variety of interfaces and functions may be created that use the information and data stored by history table objects, error logging and tracking objects and resource import objects.

Using the features and aspects described herein, applications may obtain privilege information from a central privilege management system. According to one or more configurations, the central privilege management system may produce a batch export that stores information relating to one or more privileges into a single file or data structure. Various tools may be used to produce such a batch export including XML based solutions. An application may then parse the export file to identify relevant privileges and information.

Further, using the aspects and features described herein provides enhanced flexibility and extensibility in a privilege management system. In particular, various components or objects of a privilege model may be automatically redefined based on modifications or changes to other components or object of the privilege model. For example, a privilege cascade such "All Children" allows for the automatic redefinition of the scope of the corresponding privilege in response to a modification to the hierarchy structure (e.g., the addition of a child). In another example, a resource attribute in a resource attribute set associated with a privilege may identify a particular list of items to which the privilege applies. Accordingly, the privilege may automatically be applied to a new item by adding the new item to the list. Again, no manual reconfiguration or modification of components other than the list may be needed.

Additionally, in one or more configurations, new objects such as hierarchies, resource types, applications and the like may be added to the privilege management system without the need to add or modify programming in the system. That is, new resource types and new applications may be added without new programming. Thus, objects may be created by generating a new object instance and defining one or more parameters of the new object instance. These parameters may include a name, an identification number or code, and/or identification information corresponding to one or more objects to which the new object is associated.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A non-transitory, reprogrammable computer readable medium comprising a plurality of programming instructions which, when executed in a computing system, instantiates a privilege management system, implemented as a plurality of data objects in a data model, a plurality of data objects comprising:
  a plurality of resource type objects representing a plurality of resource types corresponding to a type of application;
  a plurality of hierarchy objects representing a plurality of structures, a structure comprising a plurality of levels and defining a structure of a resource type;
  a plurality of action objects representing a plurality of actions available in a privilege management system;
  a plurality of privilege objects representing a plurality of privileges, a privilege being comprised of a selection of actions from the plurality of actions and associated with a selection of data objects from the plurality of data objects defining an application of the privilege wherein a level in the plurality of hierarchy objects is identified and applied to the privilege, and the privilege is automatically adjusted to associate a children node to the privilege when the children node is newly added to the plurality of hierarchy objects;
  a plurality of privilege cascade objects storing a privilege cascade, the privilege cascade identifying a plurality of additional hierarchy nodes to which the privilege applies based on a specified characteristic;
  a plurality of privilege-action map objects for tracking and managing associations between privilege objects and action objects;
  a user-role map object to associate a role with a user, wherein the role associates with the plurality of the privilege objects; and
  a plurality of object templates, each object template corresponding to a data object and comprising a plurality of flags defining a plurality of attributes that must be defined for a privilege to be granted to the data object;
  wherein the privilege management system provides privilege information to a plurality of applications by producing a batch export file that stores information relating to one or more privileges of the plurality of privileges, and a master list of data types corresponding to a plurality of data objects stored within the privilege management system,
  wherein an application of the plurality of applications parses the batch export file to identify the privileges and a corresponding plurality of data objects and to identify new data objects by identifying discrepancies in a comparison of the export file and the master list of data types,
  further wherein a scope of a privilege is automatically redefined in response to a modification of a data object with a relationship associated with the privileges.

2. The non-transitory, reprogrammable computer readable medium of claim 1, wherein a hierarchy object comprises a plurality of hierarchy node objects, a hierarchy node object representing a node in a structure and being configurable by modifying data associated with a plurality of parameters of the hierarchy node object.

3. The non-transitory, reprogrammable computer readable medium of claim 2, wherein the hierarchy node object specifies a level of the plurality of levels in a hierarchy structure in which the hierarchy node is arranged.

4. The non-transitory, reprogrammable computer readable medium of claim 3, wherein the plurality of data objects further comprises a plurality of portal objects defining a web front end through which a user of the privilege management system is able to access an application of the plurality of applications, the application for which one or more privileges for the user are associated.

5. The non-transitory, reprogrammable computer readable medium of claim 4, each application of the plurality of applications corresponds to a different portal object of the plurality of portal objects.

6. The non-transitory, reprogrammable computer readable medium of claim 1, wherein the specified characteristic includes a hierarchy node relationship.

7. The non-transitory, reprogrammable computer readable medium of claim 6, wherein the hierarchy node relationship comprises a parent-child relationship.

8. The non-transitory, reprogrammable computer readable medium of claim 7, wherein the privilege cascade automatically associates the privileges with a newly added child node.

9. The non-transitory, reprogrammable computer readable medium of claim 1, wherein the plurality of data objects further comprises a privilege rule object defining a privilege rule for qualifying a privilege.

10. The non-transitory, reprogrammable computer readable medium of claim 9, wherein an application of the privileges for a user of the privilege management system is based on an evaluation of one or more characteristics of the user based on a privilege rule.

11. The non-transitory, reprogrammable computer readable medium of claim 1, wherein the plurality of data objects further comprises a plurality of list objects, a list object comprising a target item list, wherein a privilege is applied to a target item selected from the target item list.

12. The non-transitory, reprogrammable computer readable medium of claim 1, wherein the plurality of data objects further comprises a plurality of resource attribute objects, a resource attribute object representing a relationship between a privilege and a plurality of other data objects.

13. The non-transitory, reprogrammable computer readable medium of claim 1, wherein the plurality of data objects further comprises: a coarse grain privilege object defining a category of the plurality of the privileges associated with a resource type object.

14. A method for associating a privilege object with a plurality of data objects in a privilege management system, the method comprising:
  in a privilege management system executing on a first processor of a first computing device, generating a batch export file that stores information relating to a plurality of privileges corresponding to a plurality of data objects, and a master list of data;
  in an application executed by a second processor of a second computing device,
    receiving the batch export file and master list of data;
    parsing the batch export file; and
    identifying a plurality of privileges and a plurality of corresponding data objects from the batch export file;
    associating a role with a user, wherein the role associates with the plurality of the privileges;
    comparing the batch export file to a master list of data types corresponding to a plurality of data objects stored within the privilege management system; and
    identifying a plurality of new data objects based on a plurality of discrepancies between the batch export file and the master list of data types,
  wherein the information relating to the plurality of privileges comprises a plurality of object templates, each object template corresponding to a data object of the plurality of data objects and comprising a plurality of flags defining a plurality of attributes that must be defined for a privilege to be granted to the data object;

wherein the plurality of data objects comprises:

a plurality of resource type objects representing a plurality of resource types, a resource type corresponding to a type of application;

a plurality of hierarchy objects representing a plurality of structures, a structure comprising a plurality of levels and defining a structure of a resource type, a plurality of action objects representing a plurality of actions available in a privilege management system;

a user-role map object to associate the role with the user;

a plurality of privilege objects representing a plurality of privileges, a privilege being comprised of a selection of actions from the plurality of actions and associated with a selection of data objects from the plurality of data objects defining an application of the privilege wherein a level in the plurality of hierarchy objects is identified and applied to the privilege, and the privilege is automatically adjusted to associate a children node to the privilege when the children node is newly added to the plurality of hierarchy objects;

a plurality of privilege cascade objects storing a privilege cascade, the privilege cascade identifying a plurality of additional hierarchy nodes to which the privilege applies based on a specified characteristic; and a plurality of privilege-action map objects for tracking and managing associations between privilege objects and action objects, further wherein the identifying a plurality of corresponding data objects from a plurality of data objects comprises identifying a component as at least one of: a resource type, a structure, an action, a privilege, and a privilege-action map.

15. The method of claim 14, wherein the plurality of hierarchy objects comprises a plurality of hierarchy node objects, a hierarchy node object representing a node in a structure and being configurable by modifying data associated with a plurality of parameters of the hierarchy node object.

16. The method of claim 14, wherein the specified characteristic includes a hierarchy node relationship.

17. The method of claim 16, wherein the hierarchy node relationship comprises a parent-child relationship.

18. The method of claim 14, wherein the plurality of data objects further comprises a privilege rule object defining a privilege rule for qualifying a privilege.

19. The method of claim 18, wherein an application of the privileges for a user of the privilege management system is based on an evaluation of one or more characteristics of the user based on a privilege rule.

20. The method of claim 14, wherein the plurality of data objects further comprises a plurality of list objects, a list object comprising a target item list, wherein a privilege is applied to a target item selected from the target item list.

21. The method of claim 14, wherein the plurality of data objects further comprises a plurality of resource attribute objects, a resource attribute object representing a relationship between a privilege and a plurality of other data objects.

* * * * *

UNITED STATES PATENT AND TRADEMARK OFFICE
CERTIFICATE OF CORRECTION

| | | |
|---|---|---|
| PATENT NO. | : 8,931,055 B2 | Page 1 of 1 |
| APPLICATION NO. | : 11/469414 | |
| DATED | : January 6, 2015 | |
| INVENTOR(S) | : Michael R. Shea | |

It is certified that error appears in the above-identified patent and that said Letters Patent is hereby corrected as shown below:

On the Title Page

Item (73) Assignee, delete "GmbH" and insert -- Limited --

Signed and Sealed this

Thirteenth Day of October, 2015

Michelle K. Lee
*Director of the United States Patent and Trademark Office*